(12) United States Patent
MacLennan et al.

(10) Patent No.: US 7,713,006 B2
(45) Date of Patent: May 11, 2010

(54) REVERSIBLE SAW TOOTH

(75) Inventors: Charles D. MacLennan, Rigaud (CA); Nick Palfy, Chomedey (CA); Denis Rioux, Rimouski (CA); Robert Mitchell, Montréal (CA)

(73) Assignee: Les Equipements Prenbec Inc., St-Eustache (CA)

( * ) Notice: Subject to any disclaimer, the term of this patent is extended or adjusted under 35 U.S.C. 154(b) by 494 days.

(21) Appl. No.: 11/560,582

(22) Filed: Nov. 16, 2006

(65) Prior Publication Data
US 2007/0151430 A1    Jul. 5, 2007

Related U.S. Application Data

(60) Provisional application No. 60/736,832, filed on Nov. 16, 2005.

(51) Int. Cl.
*B23C 5/20*    (2006.01)
*B27B 33/02*    (2006.01)

(52) U.S. Cl. .................................... 407/113; 83/839

(58) Field of Classification Search ........... 83/835–855; 407/40, 41, 102–115, 42, 48, 100; 144/34.1, 144/228
See application file for complete search history.

(56) References Cited

U.S. PATENT DOCUMENTS

| | | | |
|---|---|---|---|
| 3,490,117 A | 1/1970 | Hertel | |
| 3,619,880 A | 11/1971 | Pahlitzsch | |
| 3,818,561 A | 6/1974 | Montana et al. | |
| 3,945,289 A | 3/1976 | Baez Rios | |
| 4,018,255 A | 4/1977 | Diggs | |
| 4,116,576 A | 9/1978 | Gawryk, Sr. | |
| 4,189,264 A * | 2/1980 | Kraemer | 407/2 |
| 4,587,876 A | 5/1986 | Erhardt | |
| 4,682,916 A | 7/1987 | Briese | |
| 4,690,185 A | 9/1987 | Hamilton | |
| 4,744,278 A | 5/1988 | Wright | |
| 4,879,936 A | 11/1989 | Anderson | |
| 4,906,145 A | 3/1990 | Oliver | |
| 4,932,447 A | 6/1990 | Morin | |
| 5,026,248 A | 6/1991 | Hamilton | |
| 5,044,409 A | 9/1991 | Hamilton | |
| 5,058,477 A | 10/1991 | MacLennan | |

(Continued)

FOREIGN PATENT DOCUMENTS

CA    1103130    6/1981

(Continued)

OTHER PUBLICATIONS

*High Speed Saw Discs, Assured Performance*, Product Catalogue, Gilbert Products Inc., Dec. 2005, Canada.

*Primary Examiner*—Robert E Pezzuto
(74) *Attorney, Agent, or Firm*—Ogilvy Renault LLP

(57) ABSTRACT

A replaceable saw tooth for a rotary cutting machine. The saw tooth comprises more than two cutting edges on each of two opposed faces thereof. More specifically, the saw tooth may comprise a body having two cutting faces disposed opposite each other and spaced apart by at least four side faces which are each parallel to an opposite one of the side faces. The side faces are parallel to a central axis extending between the two cutting faces. Four cutting edges are defined between the side faces and each of the two cutting faces.

54 Claims, 29 Drawing Sheets

U.S. PATENT DOCUMENTS

| | | | |
|---|---|---|---|
| 5,067,858 A | 11/1991 | Cook | |
| 5,085,112 A | 2/1992 | MacLennan | |
| 5,088,371 A | 2/1992 | MacLennan | |
| 5,113,919 A | 5/1992 | MacLennan | |
| 5,129,438 A | 7/1992 | Hamilton | |
| 5,131,305 A | 7/1992 | MacLennan | |
| 5,161,588 A | 11/1992 | Hamilton | |
| 5,205,199 A | 4/1993 | MacLennan | |
| 5,207,748 A | 5/1993 | Katbi et al. | |
| 5,211,212 A | 5/1993 | Carlson et al. | |
| 5,233,818 A | 8/1993 | Dettbarn | |
| 5,303,752 A | 4/1994 | MacLennan | |
| 5,307,719 A | 5/1994 | MacLennan | |
| 5,377,730 A | 1/1995 | Hamilton | |
| 5,377,731 A | 1/1995 | Wildey | |
| 5,451,087 A | 9/1995 | Beaulieu | |
| 5,477,754 A | 12/1995 | Herbon | |
| 5,481,952 A | 1/1996 | MacLennan | |
| 5,529,440 A | 6/1996 | Schmidt | |
| 5,579,674 A | 12/1996 | Wildey | |
| 5,644,965 A | 7/1997 | MacLennan et al. | |
| 5,647,263 A | 7/1997 | Wildey | |
| 5,702,210 A * | 12/1997 | Boianjiu | 407/100 |
| 5,743,314 A | 4/1998 | Puch | |
| 5,810,520 A | 9/1998 | Hintze et al. | |
| 5,813,308 A | 9/1998 | Wildey et al. | |
| 5,820,308 A | 10/1998 | Hoefler | |
| 5,873,534 A | 2/1999 | Shinn | |
| 5,908,060 A | 6/1999 | Fargeot | |
| 5,975,166 A | 11/1999 | MacLennan | |
| 6,026,719 A | 2/2000 | Li | |
| 6,516,841 B1 | 2/2003 | Oilund | |
| 6,536,322 B1 | 3/2003 | Butler et al. | |
| 6,551,051 B2 | 4/2003 | Perron et al. | |
| D488,174 S | 4/2004 | East | |
| 6,725,758 B2 | 4/2004 | MacLennan et al. | |
| 6,810,783 B1 | 11/2004 | Larose | |
| 6,966,729 B2 | 11/2005 | Dehn et al. | |
| 2002/0002892 A1 | 1/2002 | DiSabatino | |
| 2004/0216580 A1 | 11/2004 | Taillon | |
| 2004/0238067 A1 | 12/2004 | Ries | |
| 2007/0193428 A1 | 8/2007 | MacLennan | |

FOREIGN PATENT DOCUMENTS

| | | |
|---|---|---|
| CA | 1269028 | 5/1990 |
| CA | 2011788 | 4/1992 |
| CA | 1325159 | 12/1993 |
| CA | 2084013 | 11/1994 |
| CA | 2048090 | 4/1996 |
| CA | 2095704 | 7/1996 |
| CA | 2116303 | 10/1996 |
| CA | 2120595 | 3/1997 |
| CA | 2029829 | 7/1998 |
| CA | 2085017 | 1/1999 |
| CA | 2242538 | 2/2000 |
| CA | 2186798 | 2/2001 |
| CA | 2232244 | 4/2003 |
| CA | 2354315 | 5/2004 |
| CA | 2422463 | 1/2006 |
| CA | 2568404 | 5/2007 |
| CA | 2588927 | 8/2008 |

* cited by examiner

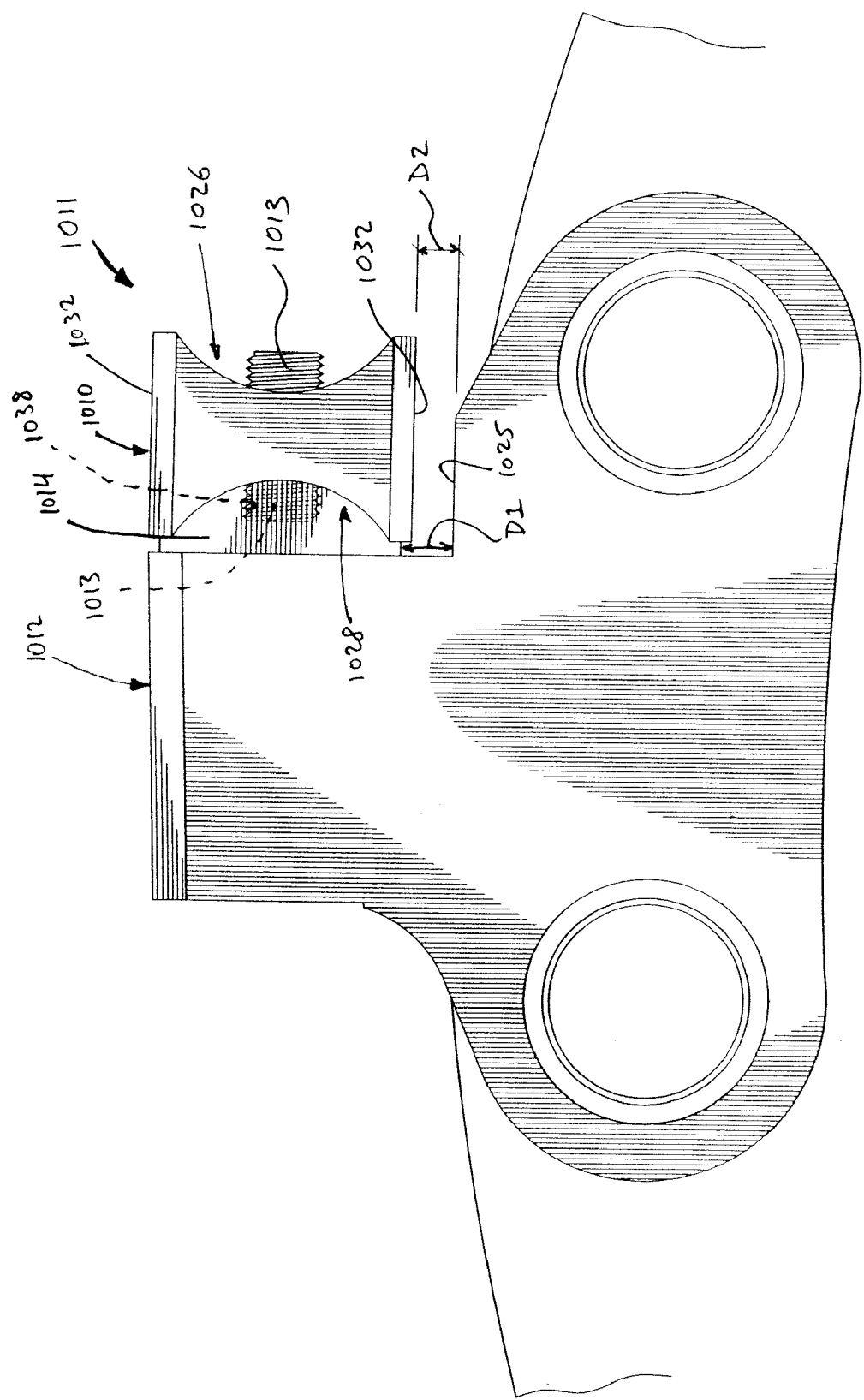

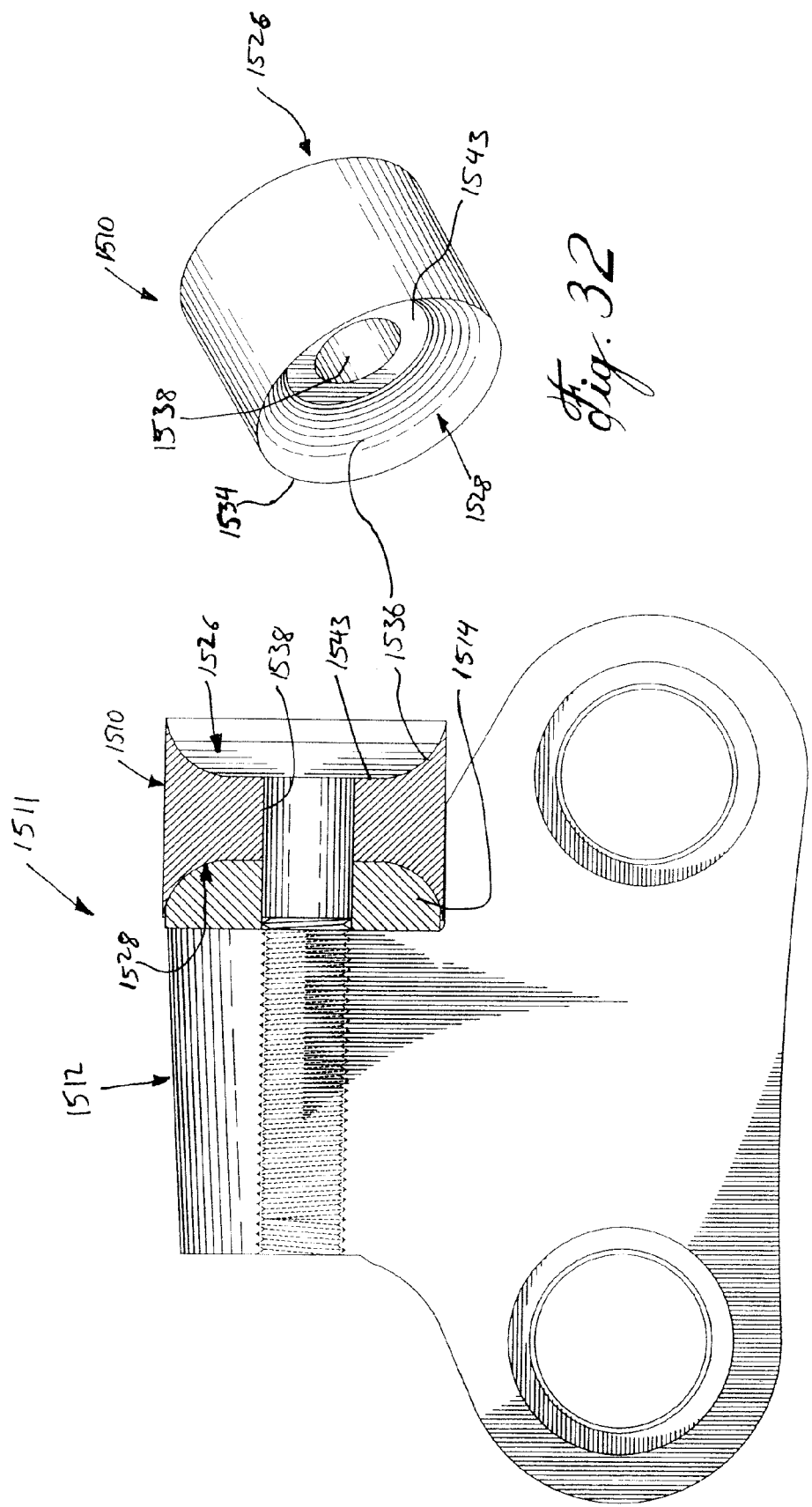

REVERSIBLE SAW TOOTH

RELATED APPLICATIONS

This application claims priority on U.S. Provisional Patent Application No. 60/736,832 filed Nov. 16, 2005, the entire specification of which is incorporated herein by reference.

TECHNICAL FIELD

The present invention relates generally to a saw tooth adapted to be engaged about a circular saw disk, and particularly to a saw tooth having a plurality of cutting edges and which is detachable from a corresponding holder. In addition, the saw tooth is configured and disposed so as to be reversible.

BACKGROUND

Circular saws, particularly relatively large ones, are used in various applications which include, but are not limited to, felling trees and other natural plant growth in the forestry industry, cutting rock and/or earth in the mining and construction industries, cutting up items such as used tires and other man-made products in various industrial applications, and in agriculture. Relatively smaller circular saws are further used in countless other smaller-scale applications, from home renovation to commercial construction. Depending on the type of circular saw, the central disk of the saw either rotates (for the smaller circular saws) or remains rotationally fixed but has teeth on linked holders which rotate about the periphery of the saw disk, much as per chain saws.

Regardless of the type of circular saw, a plurality of such cutting teeth rotate, whether independently about the periphery of the rotationally-stationary disk or together with the rotating disk when fixed thereto, in order to cut into the workpiece material to be cut.

Particularly with known saw teeth used on large circular saws, such as those used for felling trees or cutting through large volumes of man-made materials, each saw tooth may be removable from its associated holder and typically includes at least several separate cutting edges thereon. Thus, when one cutting edge wears or becomes damaged and thus unsuitable for cutting, i.e. optimum cutting, the tooth in question can be removed from the holder and replaced back in place thereon with a different cutting edge in position for contacting the workpiece. Once all the cutting edges on any saw tooth have been used, the tooth can be removed from the holder and either replaced with a new tooth or repaired and/or sharpened and replaced back in position.

Some such removable saw teeth and their associated holders are described in the following U.S. patents, the entire contents of which are incorporated herein by reference: U.S. Pat. No. 5,205,199 issued on Apr. 27, 1993, U.S. Pat. No. 5,303,752 issued on Apr. 19, 1994, U.S. Pat. No. 5,307,719 issued on May 3, 1994 and U.S. Pat. No. 5,664,965 issued on Jul. 8, 1997, all to Charles D. MacLennan. Typically, such saw teeth include up to four cutting edges on a front face of the tooth, and have a flat rear face, opposite said front face, which abuts with a corresponding surface on the holder against which the tooth is fastened in engagement.

However, while such removable saw teeth for circular saws permit improved tooth life span in comparison with fixed (i.e. non-removable or non-rotatable) teeth, improvement is nonetheless desired.

SUMMARY OF THE INVENTION

It is an object of the present invention to provide an improved saw tooth for a rotary cutting machine.

Therefore, in accordance with an aspect of the present invention, there is provided a replaceable saw tooth for a rotary cutting machine, the saw tooth being reversible and having more than two cutting edges at least partially defined by each of a first face and a second face thereof, said second face being opposite said first face.

In accordance with another aspect of the present invention, there is provided a cutting tooth for a rotary cutting machine, said cutting tooth comprising a body having two cutting faces disposed opposite each other and spaced apart by a number of side faces, i.e. for example at least four side faces, which may each be parallel to an opposite one of said side faces, said side faces may be parallel to a central axis extending between said two cutting faces, and four cutting edges defined in one embodiment at the intersection between said side faces and each of said two cutting faces.

In accordance with another aspect of the present invention, there is provided a replaceable saw tooth comprising: opposed front and rear faces, each of which at least partially defining at least two cutting edges; a central aperture extending through the saw tooth between said front and rear faces, said central aperture defining a central axis therethrough, said central axis may be perpendicular to a reference plane; and four side faces, each may be parallel to said central axis and extending between said front and rear faces, each of said four side faces defining a side face plane which may be perpendicular to said reference plane, said four side faces each having a perimeter thereabout which may define a planar shape in said side face plane, said planar shape may be substantially similar for each of said four side faces.

In accordance with another aspect of the present invention, there is provided a saw tooth assembly for a rotary cutting machine comprising: a saw tooth holder adapted for mounting about the periphery of a circular saw disk of the rotary cutting machine; and a reversible saw tooth, removably mounted to said saw tooth holder, said saw tooth having opposed first and second cutting faces each of which at least partially define more than two cutting edges.

There is further provided, in accordance with another aspect of the present invention, a rotary cutting machine comprising: a saw disk; a plurality of saw tooth holders mounted or removably mounted on the saw disk at spaced apart locations about its periphery; and at least one reversible saw tooth removably fastened on each saw tooth holder such that at least one cutting edge is disposed in an operable cutting position, each said saw tooth having opposed first and second cutting faces spaced apart by lateral surfaces extending therebetween, each of said first and second cutting faces defining four of said cutting edges thereon, and wherein said saw tooth is selectively mountable on said saw tooth holder in any one of eight different positions, each of said positions providing a different one of said cutting edges in said operable cutting position. In accordance with a further aspect of the present invention, said saw tooth holder may be provided with a shape so as to be able to mate with whichever of the first or second cutting face is not in an operable cutting position. Alternatively, in accordance with a further embodiment, the present invention may also provide for an adapter disposed between the holder and the reversible saw tooth. In yet a further embodiment, there may be provided for a rotary cutting machine comprising a saw disk wherein the outer perimeter of said saw disk is shaped so as to be able to mate with whichever of the first or second cutting face is not in an operable cutting position.

There is also provided, in accordance with another aspect of the present invention, a method of installing a saw tooth on a saw tooth holder of a rotary cutting machine, the method comprising: providing a reversible saw tooth having at least two opposed cutting faces, each of said cutting faces at least partially defining four cutting edges thereon, such that said saw tooth includes eight individual cutting edges; selecting one of said eight cutting edges for use; positioning said saw tooth in a location on said saw tooth holder such that said selected cutting edge is disposed in an operable cutting position; and removably fastening said saw tooth in said location on said saw tooth holder.

In accordance with a further embodiment of the present invention, there is provided for the use of a reversible saw tooth having at least two opposed cutting faces, each of said cutting faces at least partially defining four cutting edges thereon, such that said saw tooth includes eight individual cutting edges. In accordance with a further aspect, there is provided for the use of an adapter with a reversible saw tooth having at least two opposed cutting faces, each of said cutting faces at least partially defining four cutting edges thereon, such that said saw tooth includes at least eight individual cutting edges.

There is also provided, in accordance with another aspect of the present invention, a kit comprising a saw tooth holder of a rotary cutting machine and a saw tooth removably fastenable to a saw tooth holder, said saw tooth having opposed first and second cutting faces each of which at least partially define more than two cutting edges.

There is also provided, in accordance with another aspect of the present invention, a kit comprising a saw tooth removably fastenable to a saw tooth holder of a rotary cutting machine and an adapter for mounting intermediately between said saw tooth and said saw tooth holder, said saw tooth having opposed first and second cutting faces each of which at least partially define more than two cutting edges.

There is further provided, in accordance with another aspect of the present invention, a saw tooth assembly for a rotary saw comprising: a saw tooth holder for mounting on the periphery of a circular saw disk, the saw tooth holder having a longitudinal axis extending tangential to the periphery of the circular saw disk when the saw tooth holder is mounted thereon; a reversible saw tooth, removably mounted to said saw tooth holder, the saw tooth having opposed first and second cutting faces each of which partially define more than two cutting edges, the saw tooth having a central axis extending perpendicular to the cutting faces; and the saw tooth holder including a seat for receiving the reversible saw tooth, wherein the central axis of the saw tooth is disposed at an angle relative to the longitudinal axis of the holder.

BRIEF DESCRIPTION OF THE DRAWINGS

Further features and advantages of the present invention will become apparent from the following detailed description, taken in combination with the appended drawings, in which:

FIG. 21 is a side elevation view of a saw tooth assembly in accordance with an alternate embodiment of the present invention;

FIG. 31 is a partially sectioned, side elevation view of a saw tooth assembly in accordance with an alternate embodiment of the present invention;

FIG. 32 is a perspective view of a saw tooth of the saw tooth assembly of FIG. 31;

DETAILED DESCRIPTION OF THE PREFERRED EMBODIMENT

Figure 1:
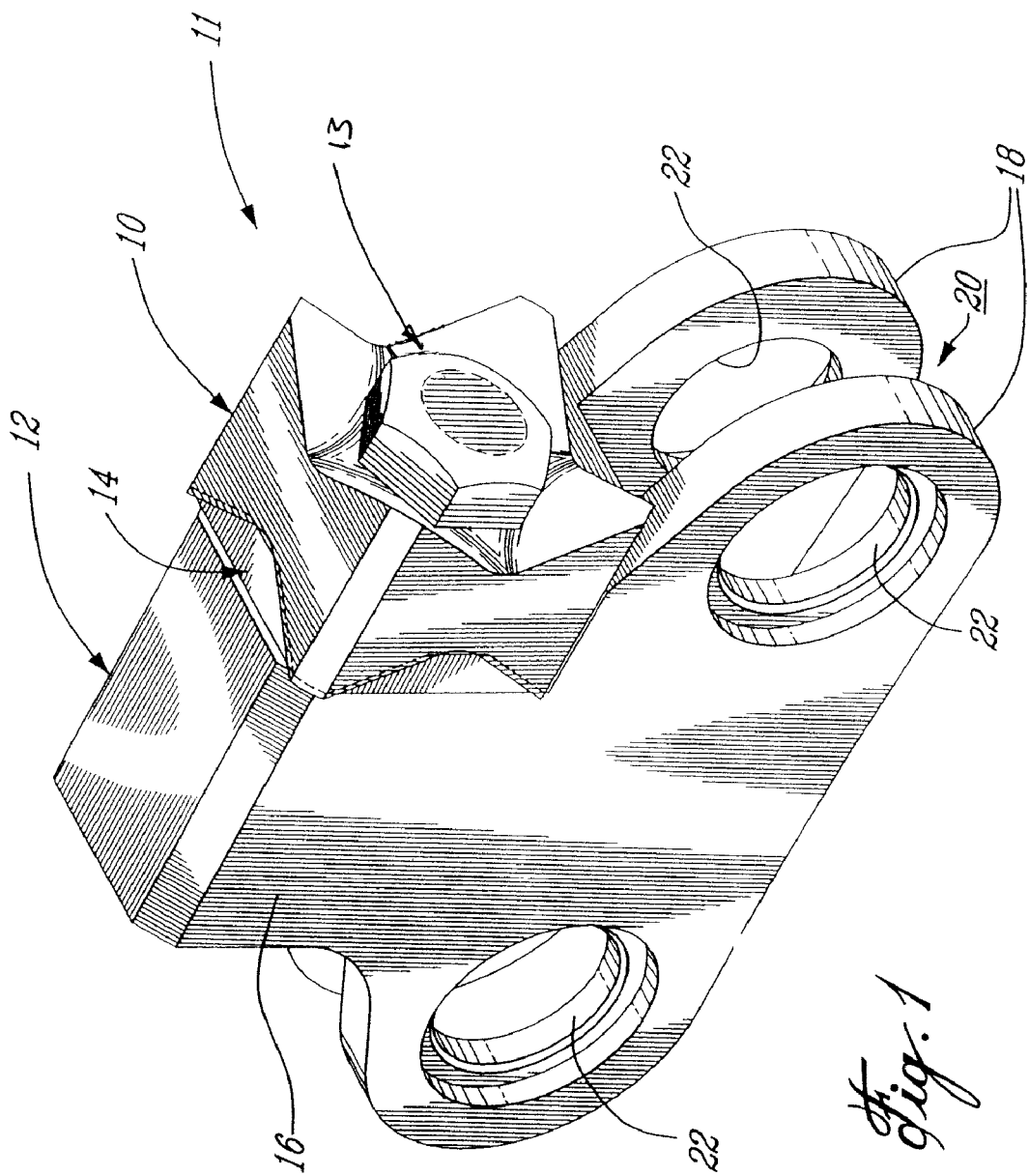
FIG. 1 is a perspective view of a saw tooth assembly in accordance with one aspect of the present invention.

The term "saw tooth" is used herein to refer to a cutting implement or tooth for use, in at least one embodiment, in a rotary cutting machine for which replaceable saw teeth may be provided, such as a circular saw having a saw disk with such replaceable saw teeth mounted about the periphery thereof, either fixed directly thereto or through a holder. However, a cutting tooth in accordance with the present invention may be used in any cutting machine for which replaceable cutting teeth may be desired, and which can be used to cut any number of materials and/or products.

Referring first to the embodiment shown in FIGS. 1 to 5, a saw tooth assembly 11 which is adapted, in at least one application of the present invention, to be mounted about the periphery of a circular saw disk 15 (see FIG. 2) of a rotary cutting machine, the saw tooth assembly 11 generally comprises at least a saw tooth holder 12 and a replaceable saw tooth 10 removably mounted thereto. Additionally, in at least one embodiment the saw tooth assembly 14 also includes an adapter 14 for mounting the tooth 10 to the holder portion 12. The saw tooth holder 12 includes a main body portion 16 and a pair of parallel plate-like legs 18 depending from opposite sides of the body portion 16 to define a slot 20 therebetween. It is to be understood, however that only a single such plate-like leg 18 may also be used. The slot 20 is adapted for receiving a peripheral edge of the saw disk 15 therein. At least one of the depending legs 18 includes at least one transverse hole 22 therethrough which corresponds to at least one aligned hole formed in the saw disk, such that a fastening element (such as a bolt or rivet, for example) can be disposed through the transverse hole 22 and the corresponding aligned hole in the saw disk in order to fasten the saw tooth holder thereto. In the embodiment depicted, two transverse holes 22 are provided through each of the depending legs 18 of the saw tooth holder 12. While this means of attaching the saw tooth holder 12 to a saw disk or other rotating element of the cutting machine is described, it is to be understood that other attachment means, either permanent or removable, may be employed in order to fasten such a saw tooth holder 12 to the necessary components of the cutting machine for operation thereof. In particular, a holder having only one pair of plate-like legs 18 may be used, or conversely, having more than two pairs of plate-like legs 18. The holder may also be permanently fixed to, or alternately integrated into, the saw disk.

Figure 27:
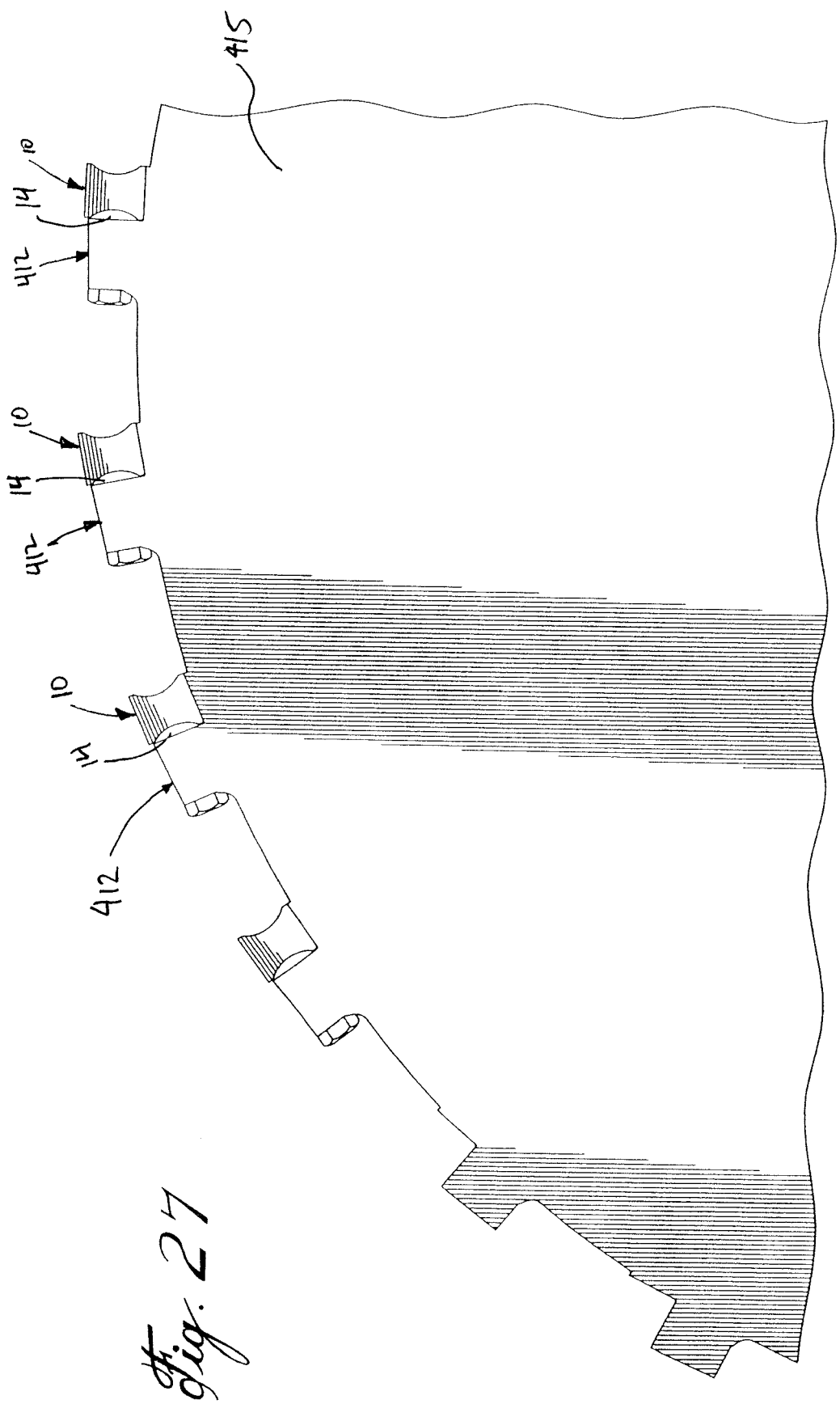
FIG. 27 is a plan view of a saw disk for a rotary cutting machine, having saw tooth assemblies thereon in accordance with one aspect of the present invention.

Further, in accordance with another embodiment, the saw disk may be fashioned so as to have a holder-like structure made or cut therein so as to directly, removably attach a saw tooth there on, as shown in FIG. 27 for example.

The replaceable saw teeth and the saw tooth assemblies of the present invention as described herein are generally intended, in one embodiment, for use in a rotary cutting machine, such as a circular saw, particularly one used for cutting trees in a feller/buncher employed in the forestry industry. However, it is to be understood that the saw teeth and the saw tooth assemblies of the present invention may be employed in any other rotary cutting machines, whether used for cutting wood products or other items. Such rotary cutting machines may include, but are not limited to, feller/bunchers, large-scale and small-scale circular saws, chainsaws, and the like.

The saw tooth 10 is removably fastened to the saw tooth holder 12, and is thus replaceable when dulled, (e.g. completely dulled) and/or damaged, with a replacement saw tooth, either the same as the one being removed or having an alternate configuration, such as for example one of the other embodiments described herein. The saw tooth 10 includes at least more than four cutting edges, particularly having more than two cutting edges defined at least partially by two opposed faces of the saw tooth such that the tooth is reversible in order to expose anyone of the at least two cutting edges defined on each of the opposed faces of the saw tooth. In one embodiment, the saw tooth 10 includes four cutting edges defined on and/or by a first face thereof and four additional cutting edges defined on and/or by an opposed second face, and thus having a total of eight cutting edges. This permits each saw tooth 10 to be rotated, such as in 90 degree increments, about a central axis (longitudinally extending between opposed cutting faces) thereof in order to position any one of the four cutting edges on the first face in an operable cutting position relative to the tooth holder. Subsequently for example, once all four first such cutting edges have been dulled and/or damaged, or as required or desired, the saw tooth is reversible by 180° about a transverse axis, i.e. from front to back, in order to expose the opposed second cutting face which itself defines four more cutting edges. The 90 degree incremental rotation, i.e. about a central longitudinal axis 42 (see FIGS. 3-4b), may then begin such that any one of the four cutting edges on the second face may be placed in an operable cutting position. As may be understood, the expression 'operable cutting position' may describe the position of a reversible tooth wherein one or alternatively two of the cutting edges are to be employed in the cutting action of the tooth. The saw tooth 10 will be described in further detail below.

Figure 2:
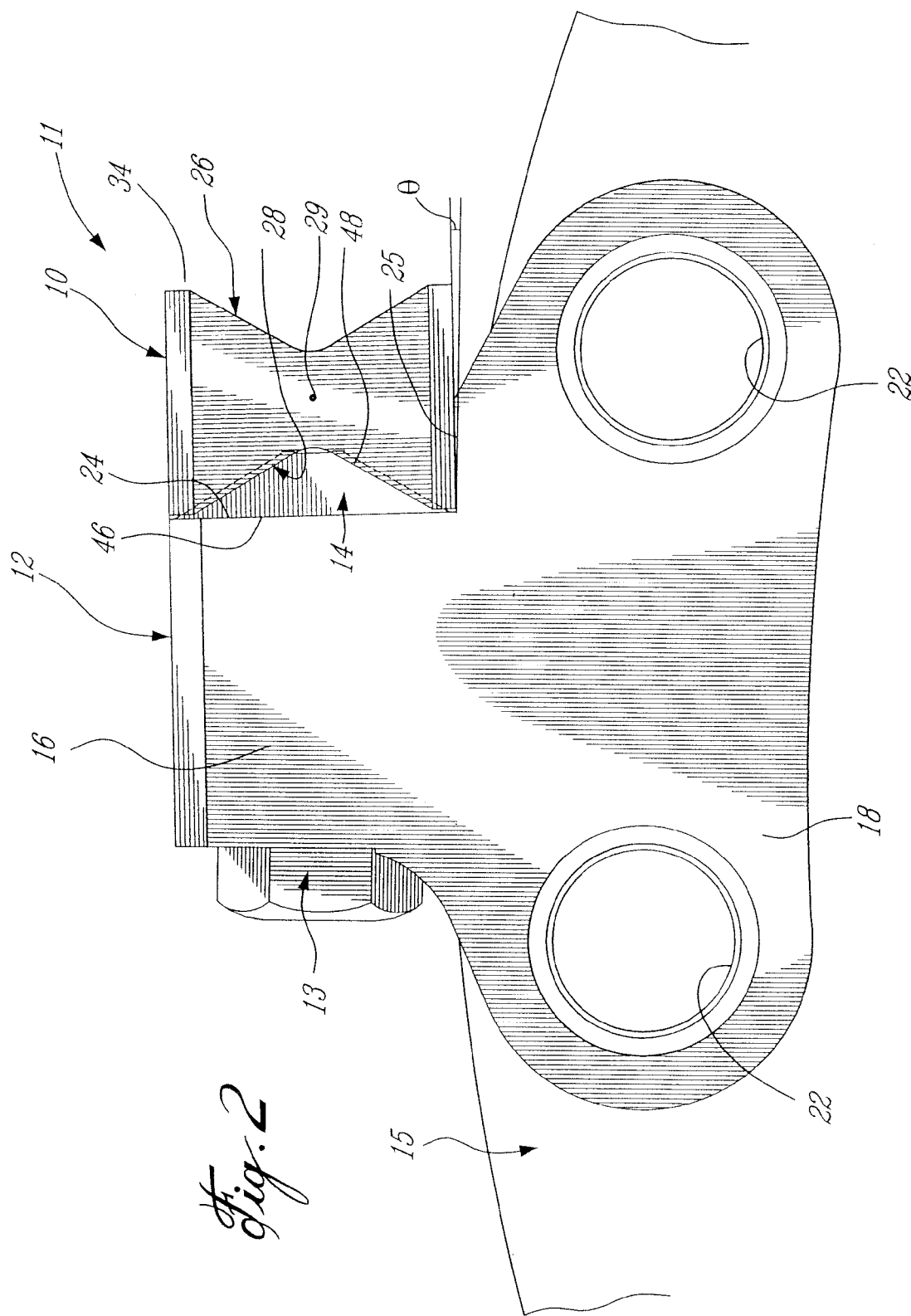
FIG. 2 is a side elevation view of the saw tooth assembly of FIG. 1, shown mounted on a disk of a rotary cutting machine.

Referring to FIGS. 1-2, the saw tooth 10 may be mounted either directly to the saw tooth holder 12, or may be mounted thereto using an adapter 14 intermediately mounted, i.e. disposed, therebetween. The adapter 14 will be described in greater detail below, however in a particular embodiment, the adapter 14 generally includes a rear substantially planar face 46, which is adapted to abut a corresponding surface 24 of the saw tooth holder 12, and an opposed front face 48, which is configured to correspond to the first and second cutting faces 26,28 of the saw tooth 10 such that mating contact therebetween is possible. Accordingly, the adapter 14 permits the saw tooth 10 having cutting faces on two sides thereof to be mounted against at least one planar surface 24 of the saw tooth holder 12. In accordance with a particular embodiment, adapter 14 permits a saw tooth 10 having cutting faces on two sides thereof to be flush mounted against at least one planar surface 24 of the saw tooth holder 12.

Figure 17:
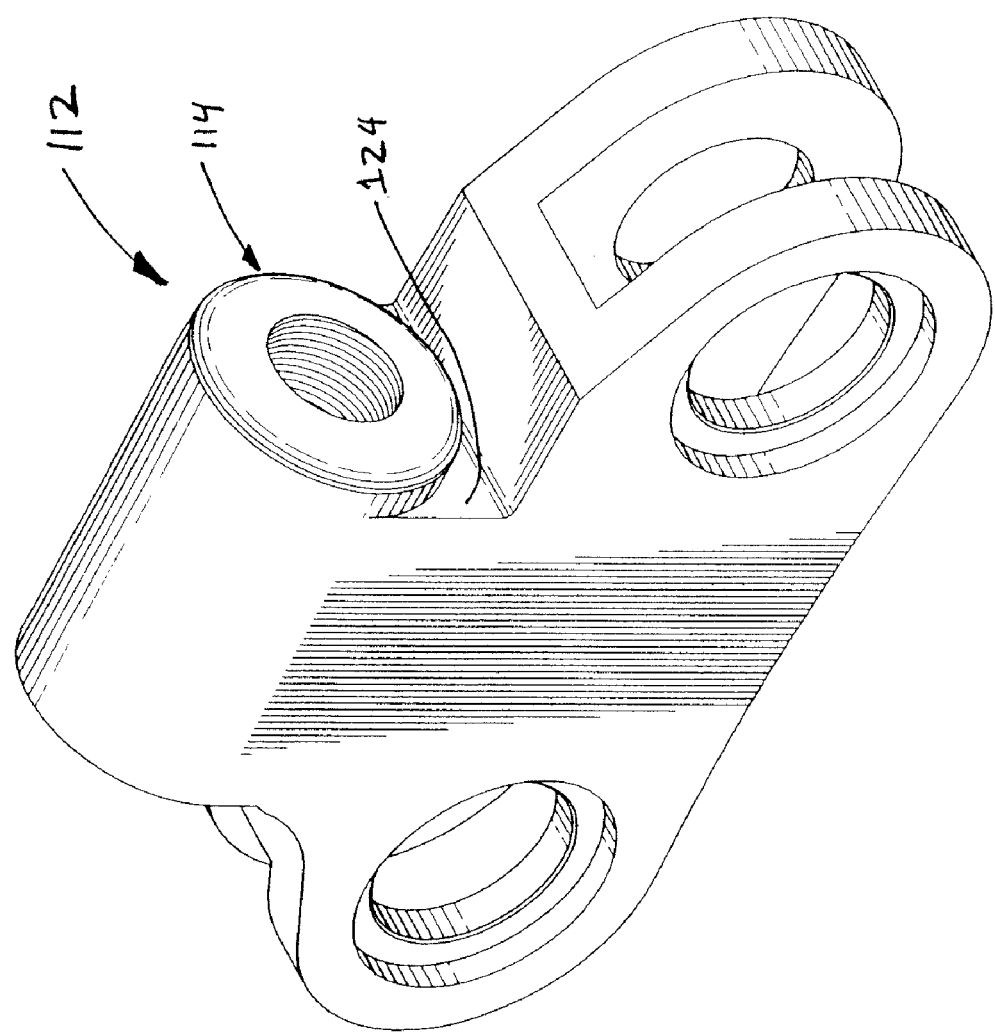
FIG. 17 is a perspective view of a saw tooth holder in accordance with an alternate embodiment of the present invention.
Figure 18:
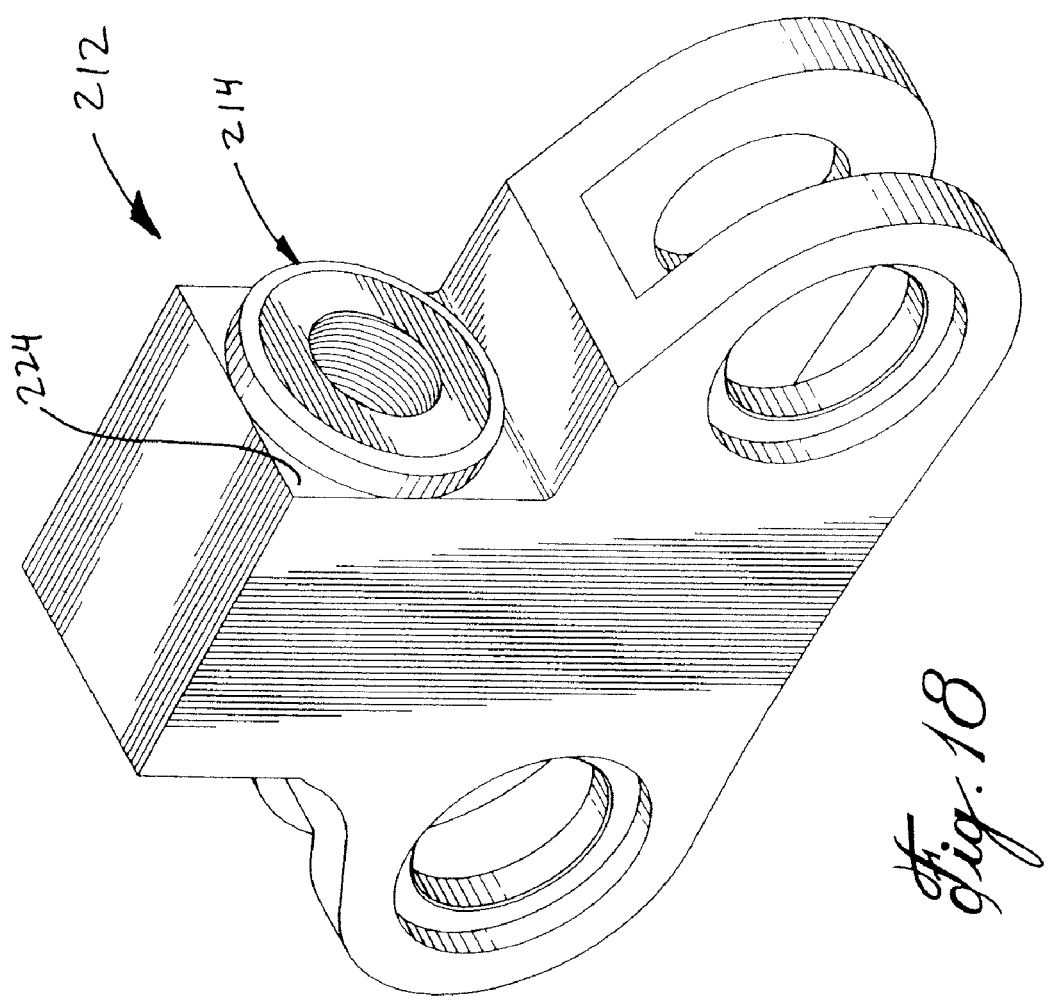
FIG. 18 is a perspective view of a saw tooth holder in accordance with an alternate embodiment of the present invention.

However, in a further embodiment, such an adapter 14 may be eliminated, providing that the saw tooth holder 12 is so configured such as to be able to permit the saw tooth 10 having opposed cutting faces 26,28 to be mounted, i.e. securely mounted, thereagainst. For example, the saw tooth holder 12 may be configured with a surface which corresponds to, and mates with, the cutting faces of the saw tooth 10, as depicted in FIGS. 17 and 18 showing the holders 112 and 212. In other words, the shape and configuration of the adapter 14 (particularly that of the outer face 48 thereof) maybe be integrally formed into the surface 24 of the saw tooth holder 12. Alternatively, an adapter 14 may be affixed to, i.e. permanently affixed, the saw tooth holder 12 in order to achieve substantially the same effect as having a holder integrally formed into surface 24 of the saw tooth holder 12. Although providing both the corresponding surface on the saw tooth holder and the rear face of the adapter 14 with substantially flat planar surfaces for secure abutment therebetween is depicted, other mating surface configurations remain possible, providing abutment, i.e. secure abutment, between the two surfaces is maintained. For example, mating concave and convex surfaces between the saw tooth holder 12 and the adapter 14 are possible, thus helping to locate and secure the adapter in place on the saw tooth holder. The use of a key and corresponding groove in surfaces 24 and 46 may also be use.

A bolt 13 or other suitable fastening element may be used to removably fasten both the saw tooth 10 and the adapter 14 to the saw tooth holder 12. As may be understood, if an adapter 14 is integrally formed with or subsequently affixed to tooth holder 12, bolt 13 may only removably secure saw tooth 10 to saw tooth holder 12. The holder 12 and the adapter 14 are each provided with an aperture therein, within which the bolt 13 is receivable for removably fastening the saw tooth (as well as the adapter if present) to the holder. Although the aperture 38 as depicted is a through-bore, it is to be understood that two opposed apertures, one defined in each of the cutting faces of the tooth, may be used without requiring that these apertures extend fully through the body of the tooth. As described in further detail below, saw tooth 10 may also include an aperture therethrough, in alignment with the corresponding apertures through the holder 12 and the adapter 14. The aperture within at least the saw tooth may include an internal thread for engagement with the threaded bolt 13, such that tightening of the head of the bolt 13 acts to draw and/or force the saw tooth 10 securely against the tooth holder for fastening the tooth in place thereon. As may be understood, one or both of the holder 12 and the adapter 14 may also be provided with an internal thread. Alternately, neither the holder, adapter or saw tooth may have such an internal thread therewithin. In this case, the bolt or other fastening element, may fasten these elements together using an additional nut threadably engaged to with the bolt 13. For example, either the bolt head or the nut may be so configured to correspond to the shape of the cutting faces, such that it is abutted thereagainst without unduly protruding therefrom so as not to obstruct or otherwise reduce the effectiveness of the cutting edges. In FIG. 1, the bolt 13 extends through the tooth, adapter and holder, with the head of the bolt being proximate to the saw tooth, i.e. the bolt is inserted from the front of the cutting face of the tooth rearwardly towards the holder. When this embodiment is used, however, it is to be understood that the head of the bolt must not interfere with the cutting faces and/or edges on the exposed cutting face of the saw tooth and also must permit the cut chips/shavings to be able to exit the cutting face. Thus, in one embodiment (not shown) the head of the bolt is of the type which is chamfered such that once fully tightened it lies flush with the surrounding surface. In the embodiment of FIG. 2, however, the bolt is mounted and introduced in the opposite manner, such that once installed the bolt head is proximate the rear surface of the holder. It is understood that either mounting configuration of the fastener (bolt or otherwise) may be used.

Further, all of the saw tooth assemblies described herein may includes a fastener, such as the bolt 13, either alone or in combination with a sleeve with which the bold can mate. The sleeve may be internally threaded, such as to act like a nut which threadably mates with the bolt 13, and in instructed into the aligned bores of each of the components of the assembly from an opposite end to the head of the bolt. Thus, when such an internally threaded sleeve is used, the bores through the center of the saw tooth, the adapter and/or the saw tooth holder may be smooth and thus not threaded. A second back sleeve may also be used at the end of the holder through which the bolt is inserted, and through which the bolt extends.

Figure 3:
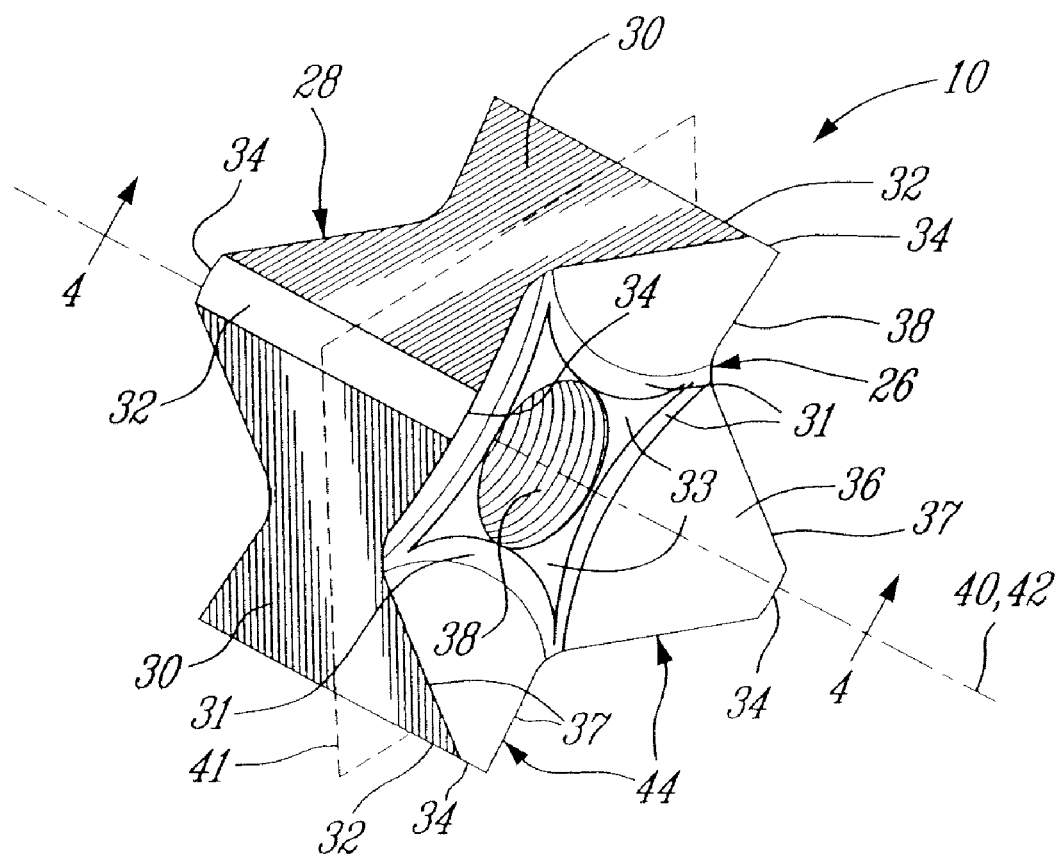
FIG. 3 is a perspective view of a saw tooth of the saw tooth assembly of FIG. 1.

Referring now to the saw tooth 10 in greater detail as depicted in FIGS. 3 and 4, the tooth 10 includes at least a first cutting face 26, a second cutting face 28 opposite the first cutting face, and a number of side faces, for example, four main side faces 30 which extend between, and space apart, the first and second cutting faces 26, 28. Additional intermediate side faces 32 may extend between the first and second cutting faces 26,28 and may be disposed between adjacent major side faces 30. Alternatively, fewer than four side faces 32 may be used, for example, three side faces. Each of the first and second cutting faces 26, 28 may define four individual cutting edges 34 (i.e. four cutting edges 34 on the first cutting face 26 and four cutting edges 34 on the second cutting face 28), which are disposed about the perimeter of each of the cutting faces 26, 28, and which may be equally spaced thereabout in the embodiment shown. The four cutting edges 34 of each of the first and second cutting faces 26, 28 are more precisely defined at the intersection of inner surfaces 36 of the cutting faces and the side faces 30, 32 of the saw tooth. In the embodiment shown, the actual cutting edges 34 are defined specifically at the intersection of the intermediate side faces 32 and the inner surfaces 36 of each of the first and second cutting faces 26, 28. Alternatively, if no intermediate side 32 is provided, the cutting edges 34 may be defined at the intersection of the inner surfaces 36 of the cutting faces 26, 28 and of two adjacent side faces 30. In such an embodiment, the cutting edges, i.e. cutting surfaces, 34 may be disposed so as to finish at a point, i.e. a peak, or alternatively the cutting edge 34 may be truncated, similar to that shown in FIG. 3. In any of the possible embodiments, the cutting edge may also extend downwardly along the intersection edge 37 between the inner surfaces 36 and each of the side faces 30.

The remaining angled intersection edge 37 defined at the intersection of each of the side faces 30 and the inner surfaces 36 of the cutting faces 26 and 28 may act as a raking edge. Thus, as may be understood, most of the cutting action of the saw tooth 10 into the material to be cut, such as wood for example, may occur mainly or principally at the cutting edges 34, such as those in the embodiment depicted, disposed at the outermost tips of each of the four triangular prisms or projections which in part define each of the first and second cutting faces, in the illustrated embodiment of FIGS. 3 and 4. While the outermost tips provide a majority of the cutting action, the inner cutting tips also help maintain a satisfactory width of the kerf produced in the material being cut. This is described in further detail in U.S. Pat. No. 5,481,952 issued Jan. 9, 1996, the entire specification of which is incorporated herein by reference.

As may be understood, alternative embodiments, configurations and shapes of the cutting faces 26, 28 are contemplated. For example, the four prisms, triangular or otherwise, may have a flat surface or may have a curved surface, for example a concave surface, or an inverted toroidal surface. Further, one or more of said prisms may have a different configuration from the others. Each of the first and second cutting faces 26, 28 are identical in the embodiment depicted. However providing that the adapter 14 (or the holder 12 in the case when no adapter is employed) is capable of adequately mating with both of the first and second cutting faces 26,28 these may differ in shape, configuration and/or cutting edge location. Additionally, the adapter 14 may have its two opposed faces, i.e. front and back, which are not identical, such that one face of adapter 14 may mate with one face 26, while the other face of adapter 14 may mate with the other face 28. Further, each of the major side faces 30 defines a plane which may be perpendicular to the plane of the next adjacent side face 30, and has a perimeter thereabout in each such plane which may form a planar shape. This planar shape, for the cutting tooth 10 depicted in FIGS. 3 and 4, defines an angular hourglass-like shape. Regardless of the particular planar shape so formed, it may be identical for each of the side faces 30. Thus, each of the side faces 30 may be of similar dimensions, such that the saw tooth 10 may define a substantially square cross-sectional area taken through a plane 41 transversely extending through the tooth 10 between the spaced apart first and second cutting faces 26, 28. The plane 41 may be perpendicular to the central axis 42 extending through the saw tooth 10.

Figure 4A:
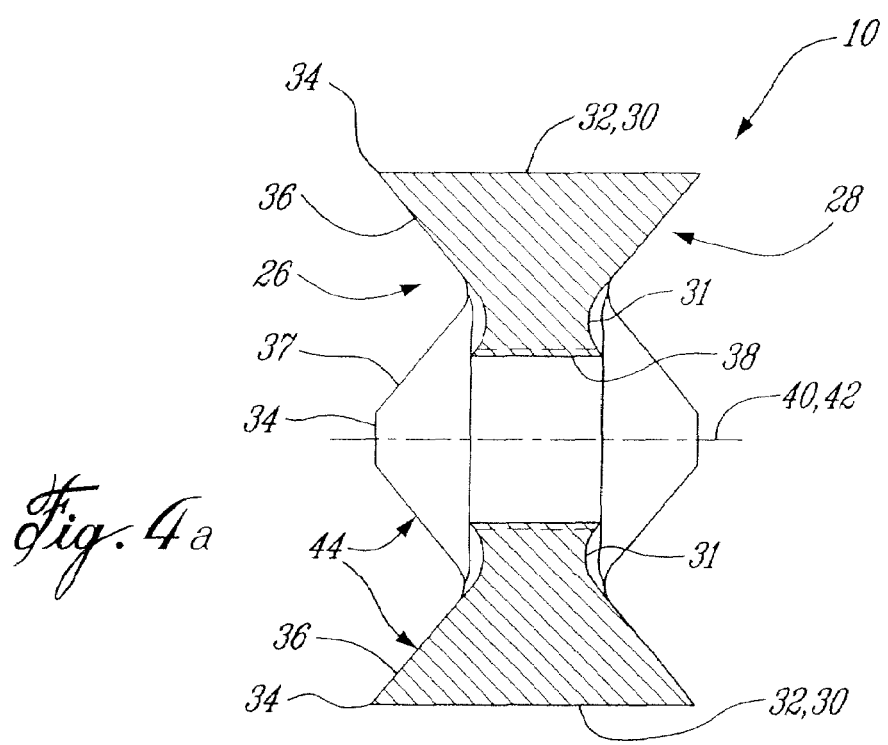
FIG. 4a is a cross-sectional view of the saw tooth of FIG. 3, taken through line 4-4 thereof.
Figure 4B:
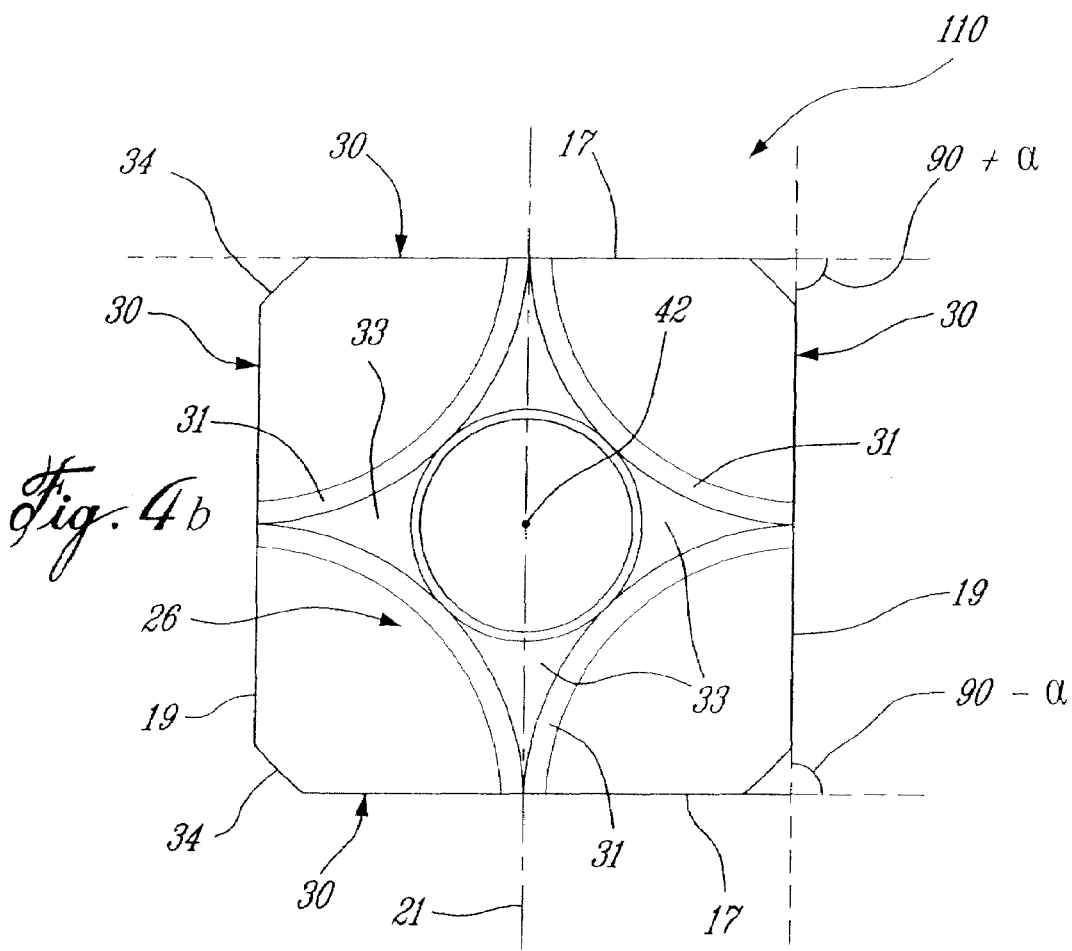
FIG. 4b is a front elevation view of an alternate embodiment of the saw tooth of FIG. 3.

As illustrated in FIGS. 3, 4a and 4b, first cutting face 26 may further comprise bottom surfaces 31 which are disposed intermediate the aperture 38 and the triangular prisms 44 disposed at each corner of the cutting tooth. As shown, the bottom surfaces are concave, however it is understood that they may be flat, i.e. substantially devoid of curvature. Further, said bottom surfaces 31 may be inclined, i.e. their outermost edge may be higher than their innermost edge or alternatively, both outer and inner edges may be at the same level, with an intermediate point being lower than either of the outer or inner edge. In addition to bottom surfaces 31, first cutting face 26 may also comprise further interior surfaces 33, which interior surfaces 33 are illustrated as being bound by two adjacent bottom surfaces 31 and aperture 38. Said bottom surfaces 33 may be flat, i.e. substantially devoid of curvature, concave or otherwise. However it is understood that they may be curved, i.e. concave. Further, said bottom surfaces 31 may be inclined, i.e. their outermost edge may be higher than their innermost edge or alternatively, both outer and inner edges may be at the same level.

Central aperture 38 extends, in the embodiment shown, completely through the saw tooth 10 between the first and second cutting faces 26,28. The aperture 38 is provided with an internal thread therein, such that the bolt 13 (see FIG. 2) is threadably engageable therewith to removably fasten the saw tooth 10 in place on the holder 12. The aperture 38 has a central longitudinal axis 40 extending therethrough which is coaxial with the central axis 42 of the saw tooth 10. Alternatively, aperture 38 may be replaced by two apertures disposed respectively through each of face 26 and 28, wherein each of said apertures is not in communication with the other. In an alternative embodiment, the saw tooth 10 may be provided with an aperture which is not threaded, i.e. for example, it may have a smooth inner wall. In such an embodiment, the bolt 13 may be sized and configured so as to releasably engage a nut which will cause the tooth 10 (and adapter 14, if needed) to be held to the holder 12. When the saw tooth 10 is in use, this nut may be disposed in threaded engagement with the bolt on the cutting face (either 26 or 28) disposed in an operable cutting position, as shown in FIG. 1 for example.

According to a particular embodiment, each of the side faces 30 and 32 of the saw tooth may be substantially parallel to the central tooth axis 42. In this manner the tooth is not tapered relative to the central axis 42, i.e. there is no taper of the side faces 30 and 32 from one cutting face 26 to the other cutting face 28 or vice versa. The saw tooth 10 may further be symmetric about two perpendicular planes of symmetry which intersect along this central axis 42, said two planes being both normal to the transverse plane 41. Further, when rotated about the central axis 42 in increments of about 90 degrees, the saw tooth 10 may remain symmetric about the transverse plane 41 as well as both the aforementioned two perpendicular planes. Alternatively, the tooth may be tapered relative to the central axis 42, i.e. there may be a taper of all or some of the side faces 30 and 32 from one cutting face 26 to the other cutting face 28 or vice versa. Further, the side faces 30 and 32 may taper inwardly in both directions towards the central plane 41, such that the side surfaces of the tooth form a V-shaped configuration.

The saw tooth 10 is rotatable about the central axis 42 in order to selectively position one of the cutting edges 34 in an operable cutting position when the tooth 10 is mounted on the saw tooth holder 12. Thus, once one cutting edge is (substantially) worn and/or damaged, or as required or desired, the tooth 10 can be rotated in increments of 90° (i.e. 90°, 180°, or 270° relative to a starting point) about the central axis 42 in order to position any one of the other three cutting edges 34 of the respective cutting face in the operable cutting position. In the embodiment depicted, this would entail loosening the bolt 13 sufficiently to permit the tooth 10 to be substantially removed from engagement therewith, such that it can be rotated as described. However, it remains possible that the tooth can be rotated in place on the holder 12, once the bolt, fastening element or other retaining means is sufficiently loosened to permit rotation of the tooth in place on the holder (i.e. without having to completely disengage the tooth from contact with the holder). This however requires that the tooth can be adequately re-fastened in place on the holder in a secure and well supported configuration for cutting operation. Referring to FIGS. 1 and 2, those cutting edges 34 disposed furthest away from the saw tooth holder 12, and therefore from the center of the saw disk to which the holder may be mounted, are those which are located in an operable cutting position. Generally, one of these two outside cutting edges performs the majority of the cutting action, and thus it is this one cutting edge which is said to be in the operative cutting position.

The four major side faces 30 may include a first pair of faces which are parallel to each other, spacing apart a second pair of faces which are parallel to each other, all of which are parallel to the central longitudinal axis 42 of the tooth. In at least one embodiment, such as the saw tooth 10 in FIG. 3, the first and second pairs are parallel to each other, and thus each side face of the first pair of faces meets the side faces of the second pair of faces at substantially a right angle. However, in an alternate embodiment, the saw tooth 110, as depicted in FIG. 4b, may be provided with a slightly skewed offset, such that a first pair 17 of side faces 30 and a second pair 19 of side faces 30 are not parallel to each other, and thus each side face does not meet the next adjacent side face at right angles. (Regardless, these side faces remain parallel to the central axis 42 of the tooth.) In other words, the saw tooth 110 of FIG. 4b defines a transverse cross-sectional shape which is a rhombus-like (with or without chamfered corners), rather than substantial square as per the saw tooth 10. The saw tooth 110, said to be "offset", thus has one of the two pairs of side faces (for example the pair of faces 19 in FIG. 4*b*) which is angled relatively to a plane 21 (i.e. faces 19 are not parallel with plane 21) which plane 21 is normal to the other of the two pairs of faces (i.e. the pair of faces 17), while remaining parallel to the central axis 42 (extending into the page in FIG. 4*b*). Thus, the relative angle between each adjacent side face 30 is one of 90°±α, where α is an angle greater than about 0 and less than or equal to about 5 degrees, for example 89.1°/90.9° (where α is 0.1), 88°/92° (where α is 2°) or 85°/95° (where α is 5°) In accordance with a further embodiment, α is between about greater than 0 and less than or equal to 15 degrees. In accordance with yet a further embodiment, α is between about greater than 0 and less than or equal to 25 degrees. The saw tooth on each next adjacent holder about the periphery of the saw disk 15 of the cutting machine may thus be alternately or randomly angled about opposite sides of a plane within which the disk lies, such that the cutting edges are staggered. A tooth in a first holder may be positioned such that the offset angle extends the cutting edge toward one side of the disk, and a tooth in the next adjacent holder about the periphery of the disk may be positioned such that the offset angle extends its cutting edge towards the other side of the disk, and so on This may hereby create a staggered cross-cut effect on the work piece being cut. Alternatively, however, the cutting edges may not be staggered or alternated, and in a further embodiment, there may be no pattern to the staggering of the tooth 10.

Referring back to FIGS. 3 and 4*a*, the raking edges 37 of the saw tooth 10 are substantially rectilinear between, at one end, the point at which adjacent raking edges 37 intersect (for example, at the midpoint of each cutting face perimeter edge), and at an opposite end, the intersection point between the raking edges 37 and each adjacent cutting edge 34. The first and second cutting faces 26,28 are recessed, creating recessed center portions thereof generally defining inner surfaces 36 thereon, and outwardly extending triangular prisms 44 at each corner of the tooth's cutting faces.

In use, once all four cutting edges 34 on a first one of the first and second cutting faces 26,28 have been dulled and/or damaged, or as required or desired, the tooth can subsequently be unfastened completely from interconnection with the tooth holder 12 and reversed (such as by being rotated 180 degrees about reversing axis 29 in FIG. 2, or from front to back) in order to dispose the other one of the cutting faces 26,28 in an outward or exposed position relative to the tooth holder 12, thereby providing four new cutting edges 34 for use. Therefore, regardless of which of the two opposed first and second cutting faces 26,28 is used, the tooth is releasably fastenable to the tooth holder 12 in substantially the same location thereon.

As best seen in FIG. 2, the saw tooth 10 is mounted on the holder 12 within an opening defined therein between substantially perpendicular surfaces 24 and 25 which create a seat within the body of the tooth holder within which the tooth 10 is received for secure fastening to the holder. While these seats 24,25 on the holder 12 are disposed in two perpendicular planes, these may each be respectively inclined relative to a radial and tangential axis of the circular saw disk 15, which may in a particular embodiment correspond to the radial and tangential axis of the holder 12 when in use. This may thus create a slight forward kerf clearance for the cutting edges 34 of the tooth. This forward clearance attack angle is represented by angle θ in FIG. 2. This attack angle may be, in at least one embodiment, only several degrees (for example from about 0° to less than or equal to about 5° in one embodiment and about 2° in the embodiment depicted). Alternatively, this angle may be less than or equal to about 10°. In a further alternative, this angle may be less than or equal to about 25°. When the angle θ is made to be 0°, no attack angle (at least relative to the tangential axis of the saw disk 15) is provided. However, in either case (i.e. angle θ is equal to zero or is greater than zero) a kerf clearance may also be provided by forming the tooth and/or the holder with a suitable angle on at least one face thereof (such as the radially outermost faces in FIG. 2 for example), thus effectively creating a clearance attack angle without having to actually angle the tooth (i.e. the central axis 42 thereof) relative to the holder and/or the tangential axis of the saw disk.

Figure 5:
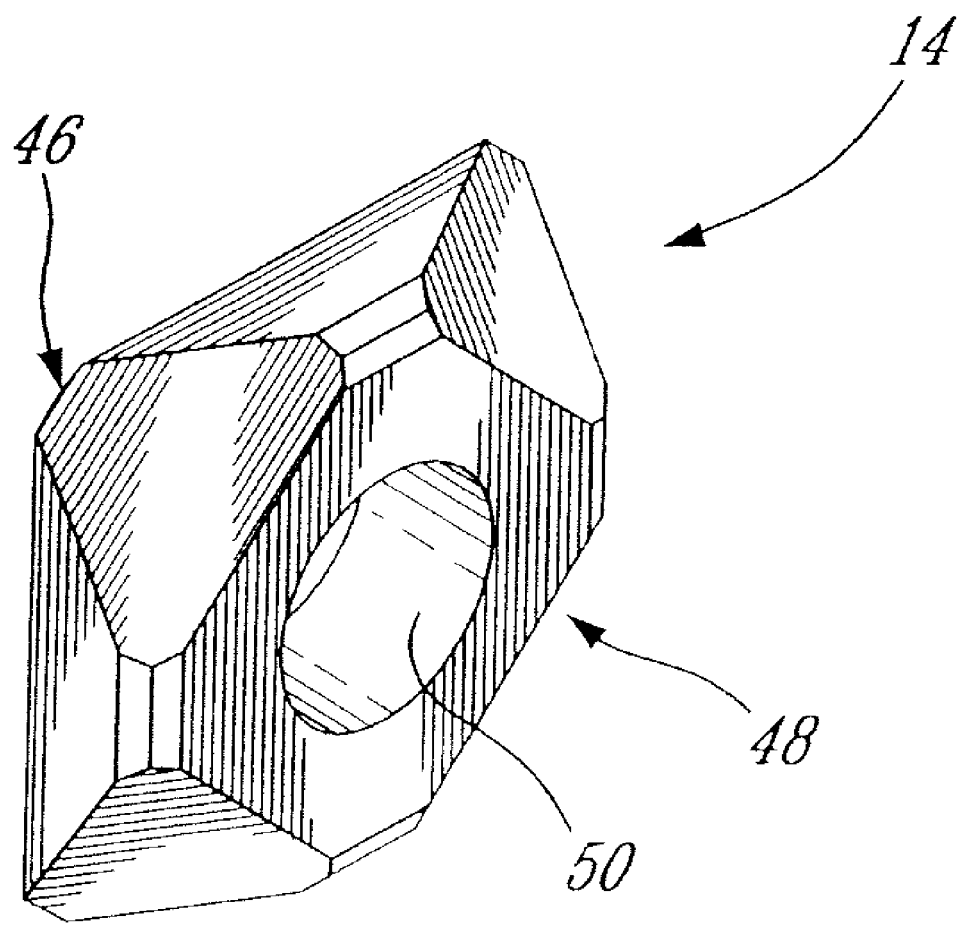
FIG. 5 is a perspective view of an adapter of the saw tooth assembly of FIG. 1.
Figure 6:
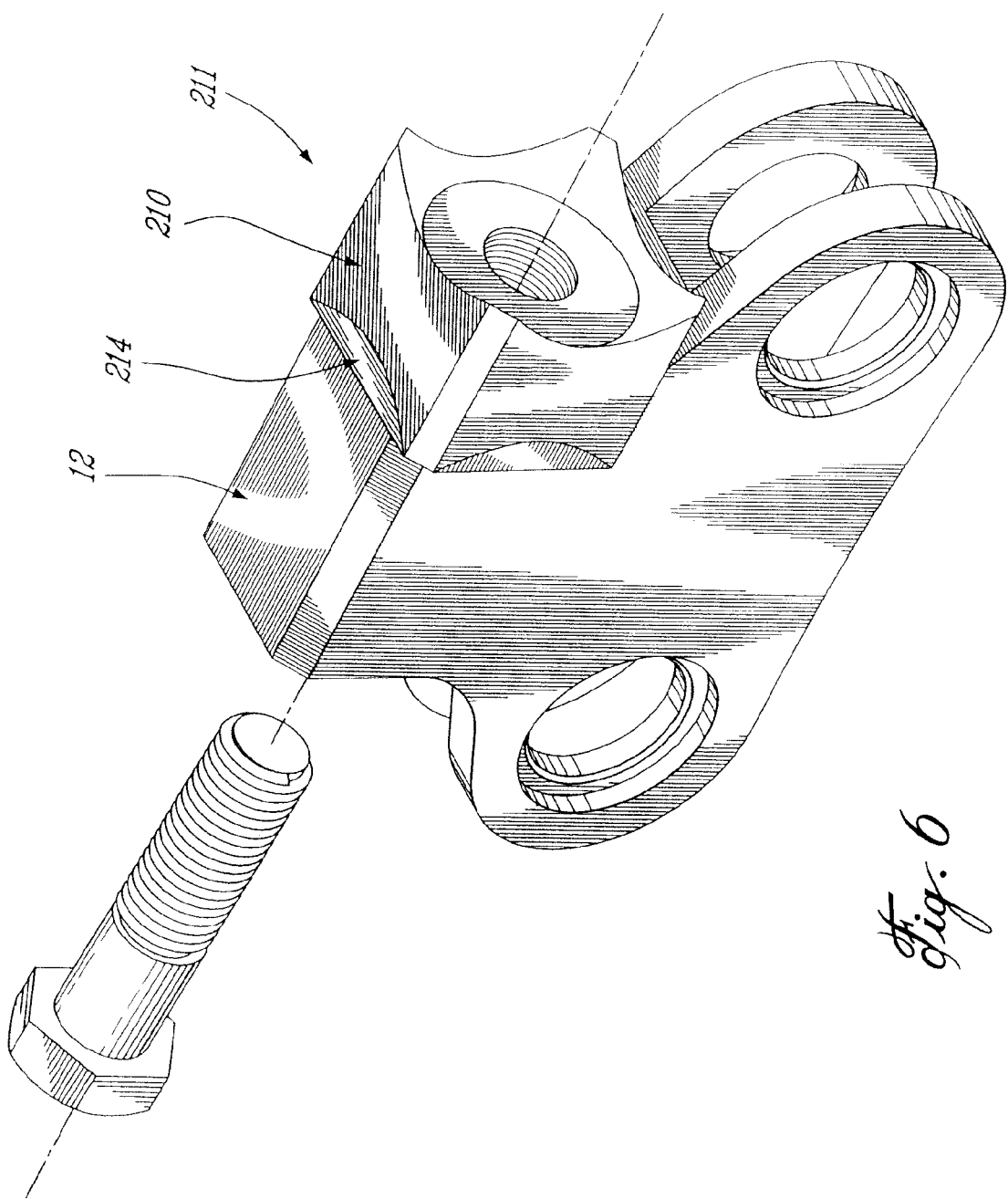
FIG. 6 is a perspective view of a saw tooth assembly in accordance with another aspect of the present invention.
Figure 7:
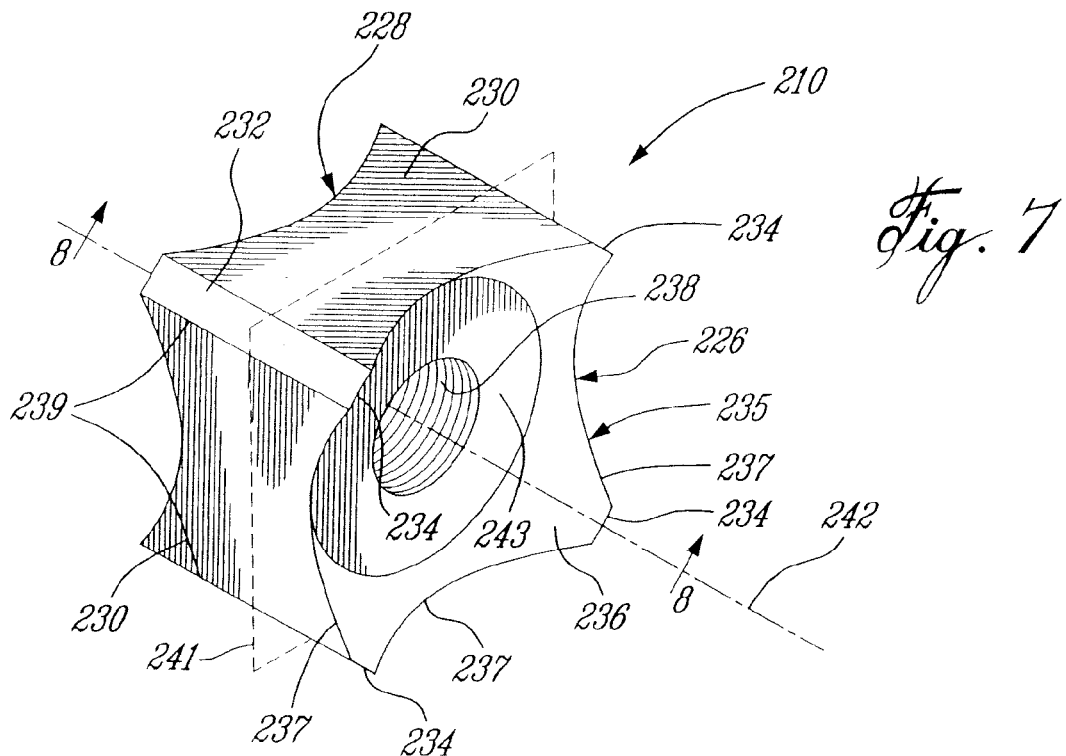
FIG. 7 is a perspective view of a saw tooth of the saw tooth assembly of FIG. 6.
Figure 8:
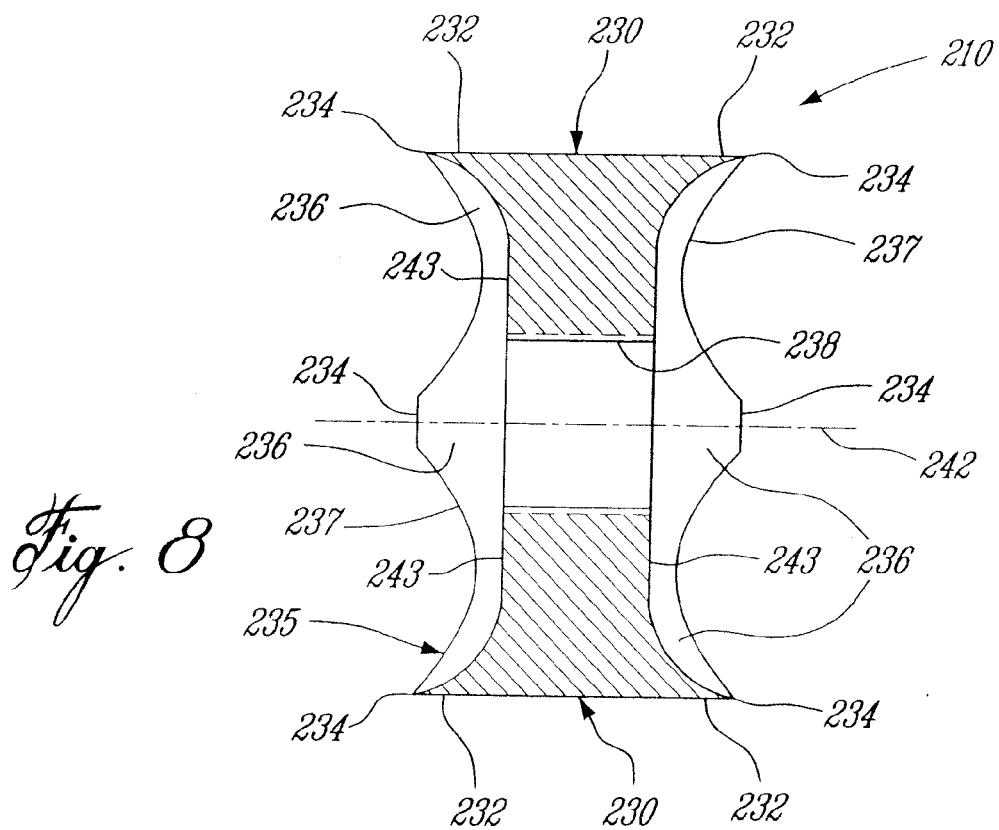
FIG. 8 is a cross-sectional view of the saw tooth of FIG. 7, taken through line 8-8 thereof.
Figure 22:
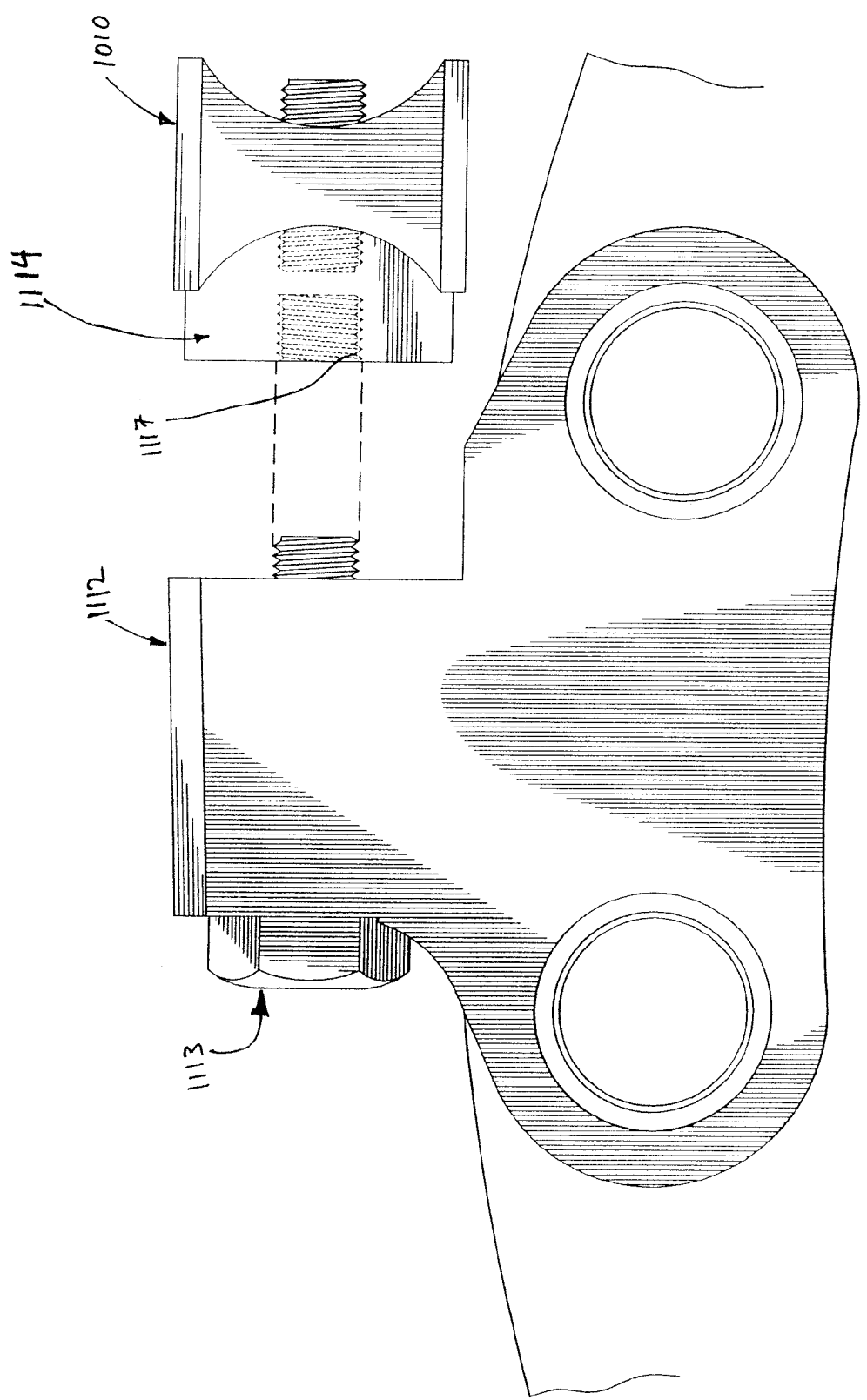
FIG. 22 is a partially exploded side elevation view of a saw tooth assembly in accordance with an alternate embodiment of the present invention.

Referring now to FIG. 5, the adapter 14 which, in one embodiment of the present invention, may be used in order to mount the saw tooth 10 to the saw tooth holder 12, is intermediately disposed therebetween when the saw tooth is fastened in place on the holder 12 as depicted in FIGS. 1 and 2. The adapter 14 may include a substantially planar rear face 46 which may abut the rear planar surface 24 of the tooth holder 12 when the adapter is mounted thereon, and has a front face 48 which may be configured to substantially correspond to one or both of the cutting faces 26 and 28 of the saw tooth 10 such that the protruding front face 48 of the adapter 14 can mate within the generally recessed inner surfaces 36 of the cutting faces 26,28 of the saw tooth for mating abutment therewith. Thus, when the adapter 14 and saw tooth 10 are mated together, at least two perpendicularly oriented flat faces may be provided on the subassembly of the tooth-and-adapter (namely, one of the side faces 30 and the planar rear face 46 of the adapter 14) for respective abutment against the perpendicular surfaces 25 and 24 defining the saw tooth receiving opening in the holder 12. When so positioned, the bolt 13 or alternate fastening means can then be used to releasably secure the adapter 14 and the saw tooth 10 to the holder 12. In order to permit this, a central aperture 50 extends through the adapter 14, in alignment with the aperture 38 defined in the saw tooth 10 and the aperture extending through the holder 12. Alternatively, as depicted in FIG. 22 for example, the tooth-and-adapter subassembly may be releasably affixed together, independently of the bolt 13, and subsequent to said attachment, the tooth-and-adapter subassembly may then be releasably affixed (i.e. attached) to the holder 12. In yet a further alternative, the adapter 14 may first be releasably affixed to the holder 12, following which the saw tooth 10 may be releasably affixed to the holder-adapter subassembly. Referring now to the saw tooth assembly 211 depicted in FIGS. 6 to 9, the saw tooth assembly 211 comprises a saw tooth holder 12, as described above with reference to the embodiment of FIGS. 1 to 2, to which is releasably mountable a saw tooth 210, either with or without an associated adapter 214. As best seen in FIGS. 7 and 8, the saw tooth 210 differs from the saw tooth 10 previously described at least in the shape and configuration of the cutting faces and their associated raking edges, however it remains similar to the saw tooth 10 in many other aspects. For example, the saw tooth 210 includes opposed first and second cutting faces 226 and 228, each of which includes at least more than two cutting edges 234 thereon. In the embodiment depicted, four cutting edges 234 are located on each of the first and second cutting faces 226 and 228. The cutting faces 226,228 are spaced apart by side faces which all extend therebetween and may be substantially parallel to a central axis 242 of the tooth, the side faces include four major side faces 230 and may further include four intermediate side faces 232 which are disposed between adjacent major side faces 230. In accordance with an alternative embodiment, saw tooth 210, as well as saw tooth 10 may not have major side faces 230 which are parallel to central axis. In particular, major side faces 230 may not be flat but may include a variety of configurations. In particular, one or more of said major side faces may comprise a curve, i.e. for example it may be concave or convex. Naturally, the corresponding portion of holder 12 may be shaped to allow for a fit therewith. Alternatively, major side faces 230 may include a gradually inclined section, for example to the halfway point of the major side face 230, followed by another inclined portion so as to create a v-shaped side, either projecting outwardly or internally. Further, as described above with respect to saw tooth 10, intermediate side faces 232 may be omitted. The intermediate side faces 232 are angled relative to each of the two immediately adjacent side faces 230, and may be disposed on one or more, i.e. on each of the four corners defined by the generally square saw tooth 210. Alternatively, one or more of the intermediate side faces 232 may be curved. A transversely extending plane 241 defined through the center of the saw tooth 210 body between the spaced apart cutting faces 226,228 thus defines a transverse cross-sectional area which is generally square in shape (at least the outer perimeter thereof). The transversely extending plane 241 is substantially normal to the central axis 242 of the saw tooth. The central axis 242 of the tooth may be substantially coaxial with a central longitudinal axis of the aperture 238 which extends through the saw tooth 210 between the first cutting face 226 and the second cutting face 228.

As per the saw tooth 10 described above, when rotated about the central axis 242 in increments of about 90 or 180 degrees, the saw tooth 210 may remain symmetric about the transverse plane 241, as well as to two other planes of symmetry which are both perpendicular to the transverse plane 241 and which intersect along the central axis 242. The saw tooth 210 is thus similarly rotatable about the central axis 242 in order to selectively position one or two of the four cutting edges 234 per each cutting face 226,228 in an operable cutting position when the tooth 210 is mounted on the saw tooth holder 12. Once the four cutting edges on one of the cutting faces have been worn or damaged, or as required or desired, the tooth 210 can then similarly be reversed such that the opposite cutting face is exposed (i.e. away from the tooth holder 12) in order to permit use of the other four cutting edges 234.

The first cutting face 226 (it is to be understood that the opposed second cutting face 228 may be identical to the first cutting face 226, and thus only one will be described in detail herein) includes a substantially square perimeter 235 therearound which includes the cutting edges 234 at each (equally) spaced apart corner thereof and raking edges 237 extending between each of the rectilinear cutting edges 234. The raking edges 237 of the saw tooth 210 are curved and more particularly define a continuous curve having a substantially constant radius. Alternatively, the curve may not be constant in radius, or may comprise two or more substantially constant radii. In a further alternative, the raking edges may comprise two straight portions spaced apart by a curved section, for example disposed substantially in the middle of the raking edge. The four cutting edges 234 are defined at the intersection of a substantially frustoconical inner surface 236 of the cutting face 226 and the four intermediate side faces 232. The cutting face 226 may further include, in addition to the frustoconical inner surface 236 which may extend about the full periphery of the cutting face 226 (bounded by the peripheral edge 235), an inner surface portion 243, which may be a substantially flat annulus and may be parallel to plane 241, radially disposed between the central aperture 238 and the surrounding frustoconical inner surface 236. The inner surface portion 243 may alternately be inclined or may also be shaped to have a curve, i.e. for example a concave curve. In a further embodiment, inner surface portion 243 may be eliminated.

Each of the major side faces 230 defines a plane and has a perimeter thereabout in each such plane which forms a planar shape. This planar shape, for the cutting tooth 210, defines a bi-concave shape, wherein top and bottom edges are rectilinear and parallel to each other while the other two edges (i.e. the raking edges 237) are curved inward towards each other. The bi-concave shape may be identical for each of the side faces 30, which may all be of substantially similar dimensions, such that the saw tooth 210 defines a substantially square cross-sectional area taken through plane 241.

Figure 9:
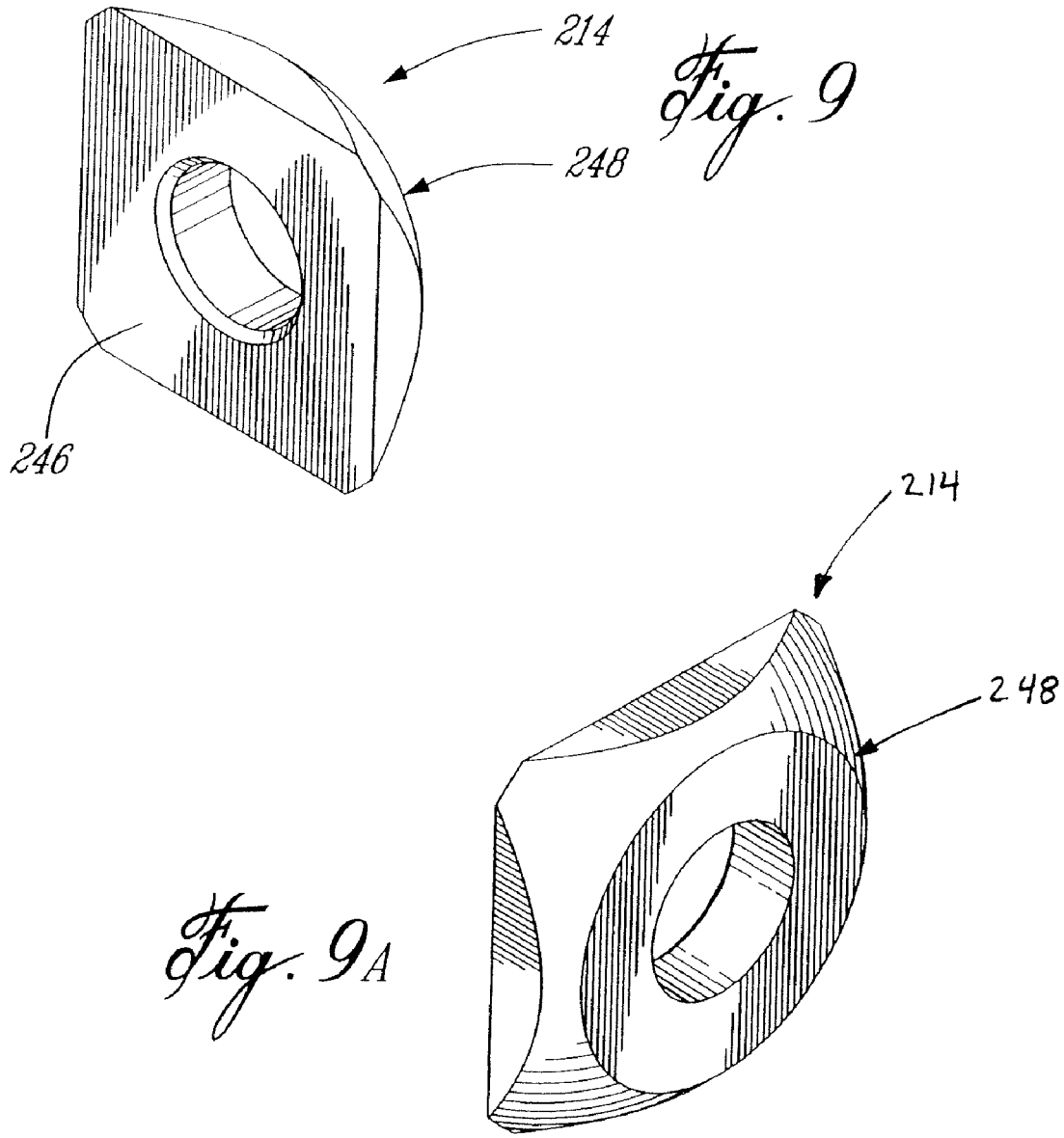
FIG. 9 is a perspective view of an adapter of the saw tooth assembly of FIG. 6.

Referring now to FIGS. 9 and 9A, the adapter 214 used, in one embodiment, to fasten the saw tooth 210 to the holder 12 includes a substantially planar rear face 246 which abuts the rear planar surface 24 of the tooth holder 12 when the adapter 214 is mounted thereon. The adapter 214 has a front face 248 which is configured to correspond to the cutting faces 226 and 228 of the saw tooth 210, such that the protruding front face 248 of the adapter 214 can mate with the inner surfaces 236 and 243 of the cutting faces 226,228 of the saw tooth for mating abutment therewith. In accordance with a particular embodiment, the mating of the inner surfaces 236 and 243 of the cutting faces 226,228 with the front face 248 may result in a perfect match of said surfaces. Thus, when the adapter 214 and saw tooth 210 are mated together to form a subassembly which is fastenable to the holder 12, at least two perpendicularly oriented flat faces are provided (namely, one of the side faces 230 of the saw tooth 210 and the planar rear face 246 of the adapter 214) for respective abutment against the perpendicular surfaces 25 and 24 defining the saw tooth receiving opening in the holder 12. Accordingly, the adapter 214 permits the saw tooth 210 to be mounted flush against at least one planar surface 24 of the saw tooth holder 12. However, as noted above with respect to the adapter 14 for the saw tooth 10, such an adapter may be eliminated providing that the saw tooth holder 12 is so configured such as to be able to permit the saw tooth 210 having opposed cutting faces 226,228 to be securely mounted thereagainst. For example, the saw tooth holder may be configured, i.e. fabricated, with a surface which corresponds to, and mates with, the cutting faces of the saw tooth. Alternatively, a piece substantially similar to adapter 14 may be permanently fitted, i.e. for example through welding or other means, onto surface 24 and/or 25.

Figure 10:
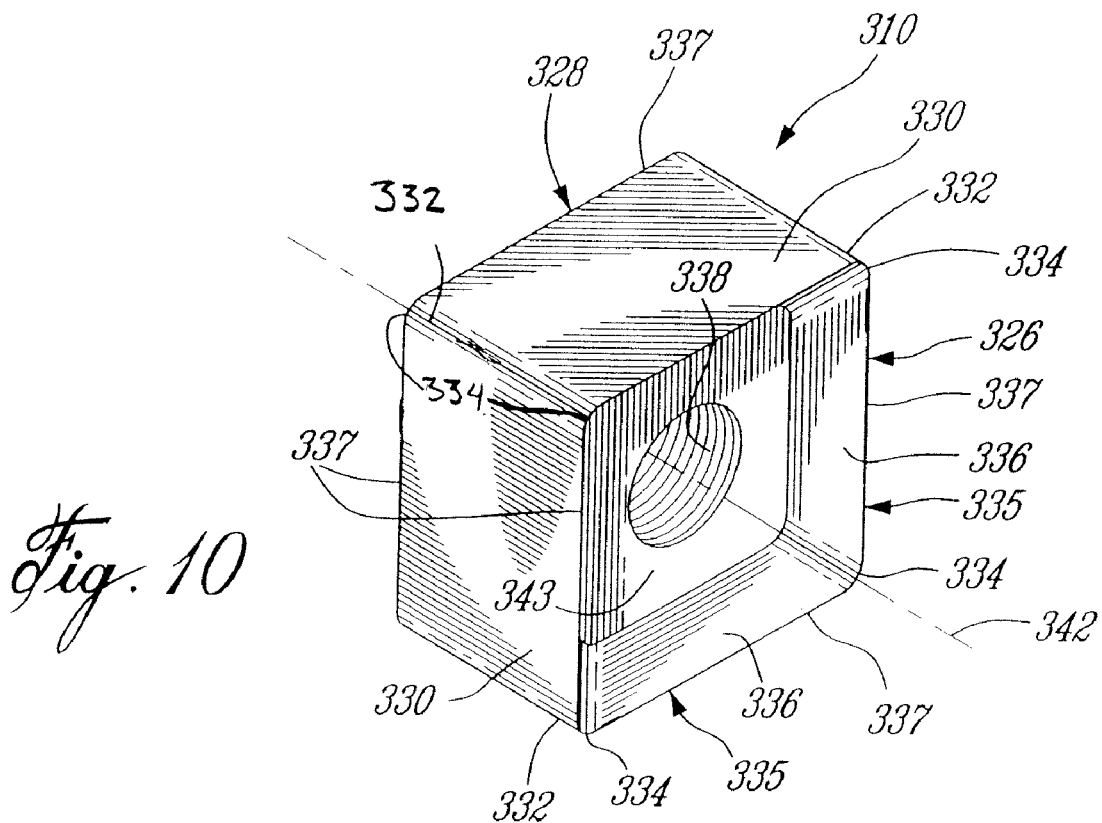
FIG. 10 is a perspective view of a saw tooth in accordance with another aspect of the present invention.
Figure 11:
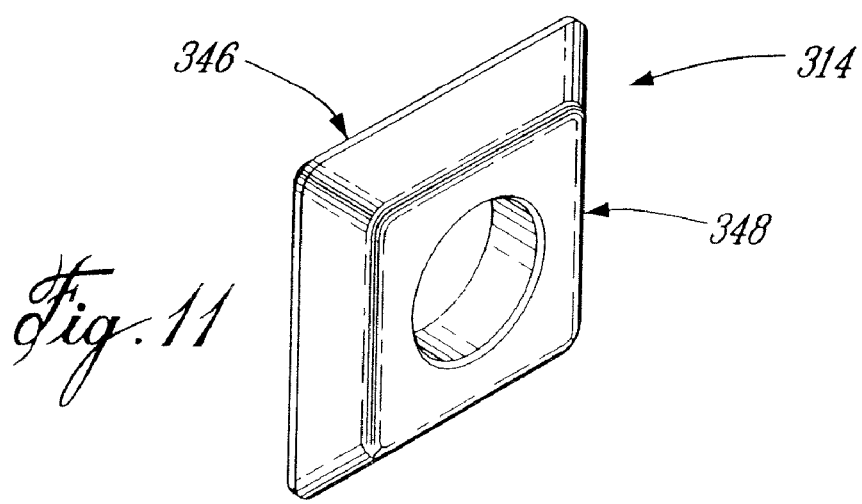
FIG. 11 is a perspective view of an adapted for use with the saw tooth of FIG. 10.

Referring now to the embodiment of the present invention depicted in FIGS. 10-11, an alternately shaped saw tooth 310 is shown. The saw tooth 310 includes opposed first and second cutting faces 326 and 328 which are spaced apart by four lateral side faces 330 that extend axially between the two cutting faces. Adjacent side faces 330 meet along rounded (axially-extending) edges 332 located at each corner of the substantially square saw tooth 310 between each of the planar side faces 330. The cutting edges 334 of the saw tooth 310 are defined along the edges formed at the intersection of the side faces 330 (including the rounded corner edges 332) and the outermost inner surface 336 which extends around the periphery of the cutting faces 326,328. The cutting edges 334 may be defined either only at the corners of the cutting face (i.e. at the intersection of the corner edges 332 and the inner surface 336) and/or alternately along the length of long edge 337 of the cutting face (i.e. at the intersection of the side faces 330 and the inner surface 336). The long edges 337, which are substantially rectilinear extending in a straight line between adjacent corners of the saw tooth, can thus act either as principle cutting edges or as raking edges.

Each of the side faces 330 defines a plane which is substantially perpendicular to that of the next adjacent side face 330, and which has a perimeter thereabout in each such plane that forms a planar shape. However, as described below, the planes of each adjacent side face 330 may alternately not perpendicular to each other, wherein the tooth is provided with a skewed offset such as tooth 110 of FIG. 4b. The planar shape defined in each plane of the side faces 330, for the cutting tooth 310, defines a square which may be identical for each of the side faces 30. All of the side faces 330 have substantially similar dimensions, such that the saw tooth 310 defines four substantially square side faces 330 about the lateral surface thereof. Thus, when the tooth 310 is rotated about its central axis 342 in increments of about 90 or 180 degrees, one or more of the cutting edges 334 is disposed in an operative cutting position. The saw tooth 310 may also have a substantially square cross-sectional area taken through a central plane (as per planes 41 and 2410 disposed between the opposed cutting surfaces 326 and 328 and being perpendicular to the central tooth axis 342. The saw tooth 310 may thus form a cube, however with recesses formed therein in the first and second cutting faces 326 and 328. Each of the two cutting faces may define a substantially square perimeter edge 335 therearound, which comprises at least the four cutting edges 334 and the four raking edges 337 disposed therebetween. The perimeter edge 335 bounds the inner surfaces of the cutting faces 326,328. These inner surfaces include four inwardly angled, radially-outermost inner surfaces 336 which extend about the periphery of each cutting face, as well as a flat inner surface portion 343 disposed between the central aperture 338 (extending through the saw tooth 310 between the opposed first and second cutting faces 326 and 328) and the four surrounding surfaces 336. The flat inner surface portion 343 may be substantially square-shaped.

As seen in FIG. 11, an adapter 314 may also be provided for use with the saw tooth 310. The adapter 314 corresponds to the shape and configuration of the saw tooth 310, having a front face 348 which is configured to correspond to the cutting faces 326 and 328 of the saw tooth 310, such that the protruding front face 348 of the adapter 314 can mate within the inner surfaces 336 and 343 of the cutting faces 326,328 of the saw tooth for mating abutment thereagainst. As per the previously described adapters, the adapter 314 includes a substantially planar rear face 346 which abuts against the rear planar surface 24 of the tooth holder 12 when the adapter 314 is mounted thereon. Accordingly, when the adapter 314 and saw tooth 310 are mated together to form a subassembly which is fastenable to the holder 12, at least two perpendicularly oriented flat faces are provided (namely, one of the side faces 330 of the saw tooth 310 and the planar rear face 346 of the adapter 314) for respective abutment against the perpendicular surfaces 25 and 24 defining the saw tooth receiving opening in the holder 12. The adapter 314 therefore permits the saw tooth 310 to be mounted flush against at least one planar surface 24 of the saw tooth holder 12. However, as noted above, such an adapter may be eliminated providing that the saw tooth holder 12 is so configured such as to be able to permit the saw tooth 310 having opposed cutting faces 326, 328 to be securely mounted thereagainst. As may be understood, however, the use of an adapter may allow a common saw tooth holder (such as the holder 12 of FIGS. 1-2 and 6 for example) to be used for selectively mounting thereto any one or combination of several different tooth types, embodiments or variants, such as any one of the saw teeth 10, 110, 210 or 310 for example.

As described above relative to the tooth 110 as depicted in FIG. 4b, the saw teeth 210 and 310 may similarly be provided with a slightly skewed offset, such that a first pair of the side faces 230/330 and a second pair of the side faces 230/330 are not parallel to each other, and thus such that each side face does not meet the next adjacent side face at right angles. In other words, the saw tooth 210 and the saw tooth 310 may, in alternate embodiments not depicted, define a transverse cross-sectional shape which is more rhombus-like (with or without chamfered corners), rather than substantial square as per teeth depicted. The saw teeth 210 and 310 can thus be skewed as per the tooth 110, i.e. said to be "offset", such that one of the two pairs of side faces is angled relatively to a plane which is normal to the other of the two pairs while remaining parallel to the central axis of the tooth. Thus, a non-90 degree relative angle between each adjacent side face 230/330 is provided.

Figure 12:
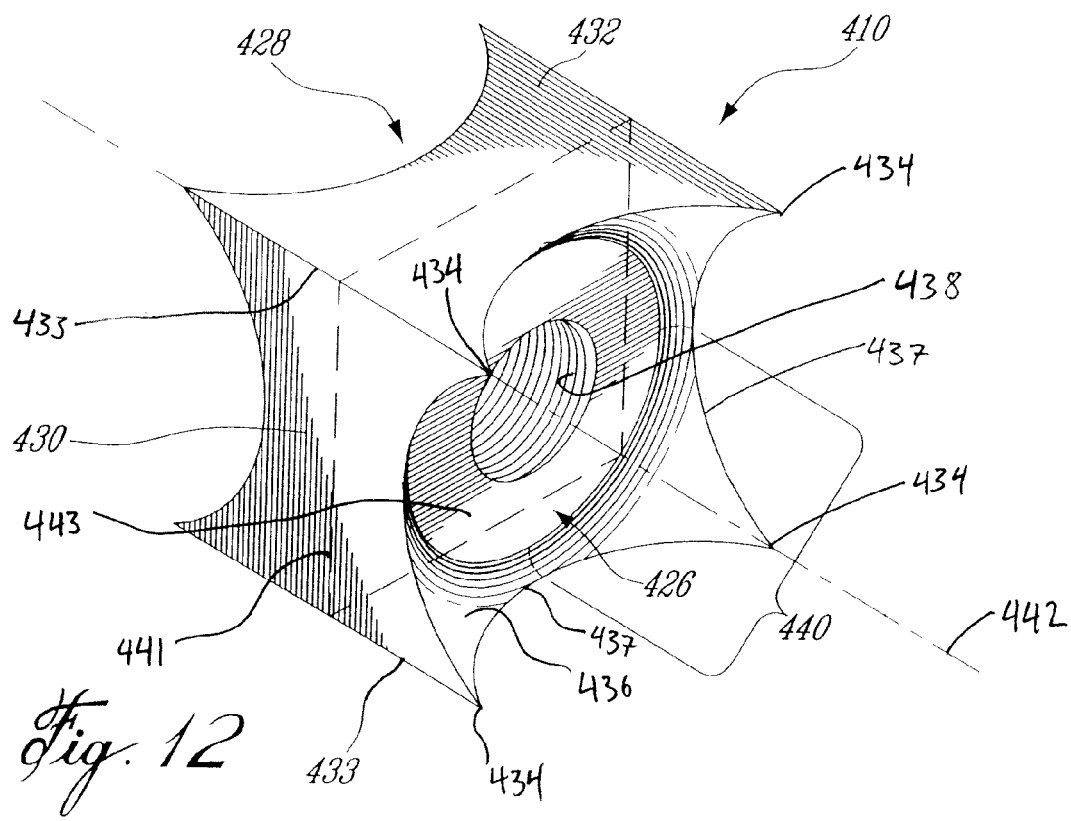
FIG. 12 is a perspective view of a saw tooth in accordance with an alternate embodiment of the present invention.

Referring now to FIG. 12, an alternate embodiment of the present invention is shown, in which the saw tooth 410 is similar to those previously described, however differs in the shape and configuration of the cutting faces/edges and their associated raking edges. Particularly, the reversible saw tooth 410 includes opposed first and second cutting faces 426 and 428, each of which includes at least more than two cutting edges 434 thereon. In fact, in the embodiment depicted, each cutting face includes four cutting tips 434, which are in fact cutting tips in the present embodiment. The four cutting tips 434 are located at four opposed corners of each cutting face 426,428, which are coincident with the side edges 433 that extend between the first and second cutting faces 426,428 at each remote corner of the square-sections body of the saw tooth 410.

The cutting faces 426,428 are spaced apart by side faces 430 which all extend therebetween and may be substantially parallel to a central axis 442 of the tooth. In accordance with an alternative embodiment, saw tooth 410 may not have side faces 430 which are parallel to central axis 442. The side faces 430 extend in a fore-aft direction of the tooth between the first and second cutting faces 426, 428 and in a direction substantially normal thereto between the side edges 433. The side faces 430 each thus define a plane which may be perpendicular to the plane of the next adjacent side face 430, and which has a perimeter thereabout in each such plane which forms a planar shape. This planar shape, for the cutting tooth 410 depicted in FIGS. 12 and 12A, defines an hourglass-like shape having a flat truncated top and bottom (i.e. the side edges 433), and opposed smoothly curved sides (i.e. the raking edges 437). This shape is clearly seen in FIG. 12A. In the depicted embodiment, the raking edges 437 (of which there are four on each of the first and second cutting faces 426, 428) have a substantially constant radius about their full length between the cutting tips 434.

Regardless of the particular planar shape so formed by the sides 430, it may be identical for each of the side faces 430. Thus, each of the side faces 430 may be of similar dimensions, such that the saw tooth 410 may define a substantially square cross-sectional area taken through the plane 441 transversally extending through the tooth 410 between the spaced apart first and second cutting faces 426, 428. Alternately, of course, and as described above, each of the major side faces 430 may not be flat but may include a variety of configurations. In particular, one or more of said major side faces may comprise a curve, i.e. for example it may be concave or convex. Naturally, the corresponding portion of holder corresponding to the tooth 410 for use therewith may be shaped to allow for a fit therewith. Alternatively still, major side faces 430 may include a gradually inclined section, for example to the halfway point of the major side face 430, followed by another inclined portion so as to create a v-shaped side, either projecting outwardly or internally. The transversely extending plane 441 defined through the center of the saw tooth 410 body between the spaced apart cutting faces 426,428 thus defines a transverse cross-sectional area which is generally square in shape (at least the outer perimeter thereof). The transversely extending plane 441 is substantially normal to the central axis 442 of the saw tooth. The central axis 442 of the tooth may be substantially coaxial with a central longitudinal axis of the aperture 438 which extends through the saw tooth 410 between the first cutting face 426 and the second cutting face 428.

As per the saw teeth described above, when rotated about the central axis 442 in increments of about 90 or 180 degrees, the saw tooth 410 may remain symmetric about the transverse plane 441, as well as to two other planes of symmetry which are both perpendicular to the transverse plane 441 and which intersect along the central axis 442. The saw tooth 410 is thus similarly rotatable about the central axis 442 in order to selectively position one or two of the four cutting edges (tips) 434 of each cutting face 426,428 in an operable cutting position when the tooth 410 is mounted on the saw tooth holder. Once the four cutting edges on one of the cutting faces have been worn or damaged, or as required or desired, the tooth 410 can then similarly be reversed such that the opposite cutting face is exposed (i.e. away from the tooth holder 12) in order to permit use of the other four cutting edges 434.

Figure 16:
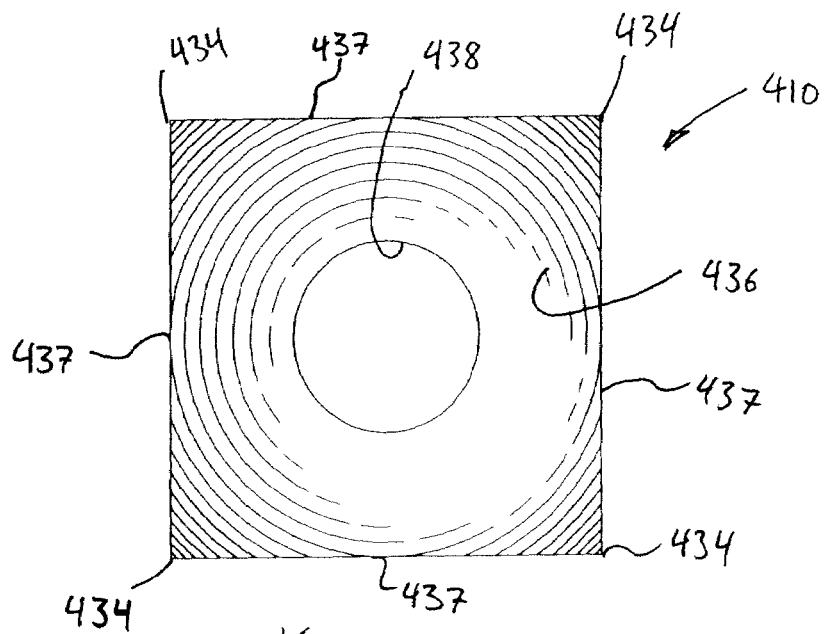
FIG. 16 is a front elevation view of a saw tooth in accordance with an alternate embodiment of the present invention.

The first cutting face 426 (it is to be understood that the opposed second cutting face 428 may be identical to the first cutting face 426, and thus only one will be described in detail herein) includes a substantially square perimeter therearound when viewed from the front of the cutting face, which includes the cutting edges 434 at each equally spaced apart corner thereof and raking edges 437 extending therebetween. As noted above, the raking edges 437 of the saw tooth 410 are curved and more particularly define a continuous curve having a substantially constant radius extending between each of the cutting tips 434. Alternatively, the curve may not be constant in radius, or may comprise a compound curve having two or more curves, whether of substantially constant radii or not. The four cutting tips 434 are defined at the intersection of a substantially frustoconical, curved inner surface 436 of the cutting face 426 and two of the curved raking edges 437 at the periphery of the cutting face. The cutting face 426 may further include, in addition to the frustoconical inner surface 436 which may extend about the full periphery of the cutting face 426 (bounded by the peripheral edge thereof), an inner surface portion 443, which may be a substantially flat annulus having a diameter 440. The annular and flat inner surface 443 of the cutting face may be parallel to transversal plane 441 and is radially disposed between the central bore or aperture 438 and the surrounding frustoconical inner surface 436. The inner surface portion may alternately be inclined or may also be shaped to have a curve, i.e. for example a concave curve, rather than being flat and thus parallel to the plane 441. In a further embodiment, as shown in FIG. 16, the inner surface portion 243 may be eliminated completely, in which case the frustoconical inner surface 436 extends inwardly from the outer periphery of the cutting face (defined by the four raking edges 437) all the way to the central bore/aperture 438.

Figure 12A:
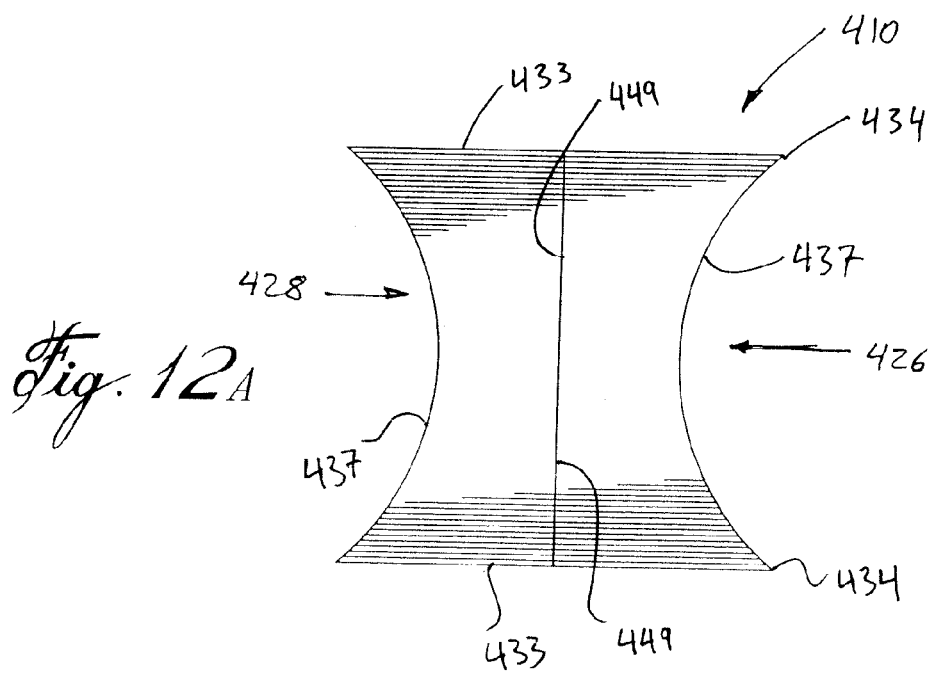
FIG. 12A is a side elevation view of a variant of the saw tooth of FIG. 12.

As seen in FIG. 12A, the saw tooth 410 may also be formed for two portions, in this case two identical halves, which abut together to form the full saw tooth 410. It is to be understood that the tooth 410, as well as all of the saw teeth described above, can be so formed to two interlocking portions. In the embodiment of FIG. 12A, the saw tooth 410 is split along the transverse plane 441 such as to divide the whole tooth into two equal halves which each have inner surfaces 449 that abut each other at this midpoint transverse plane.

Figure 13:
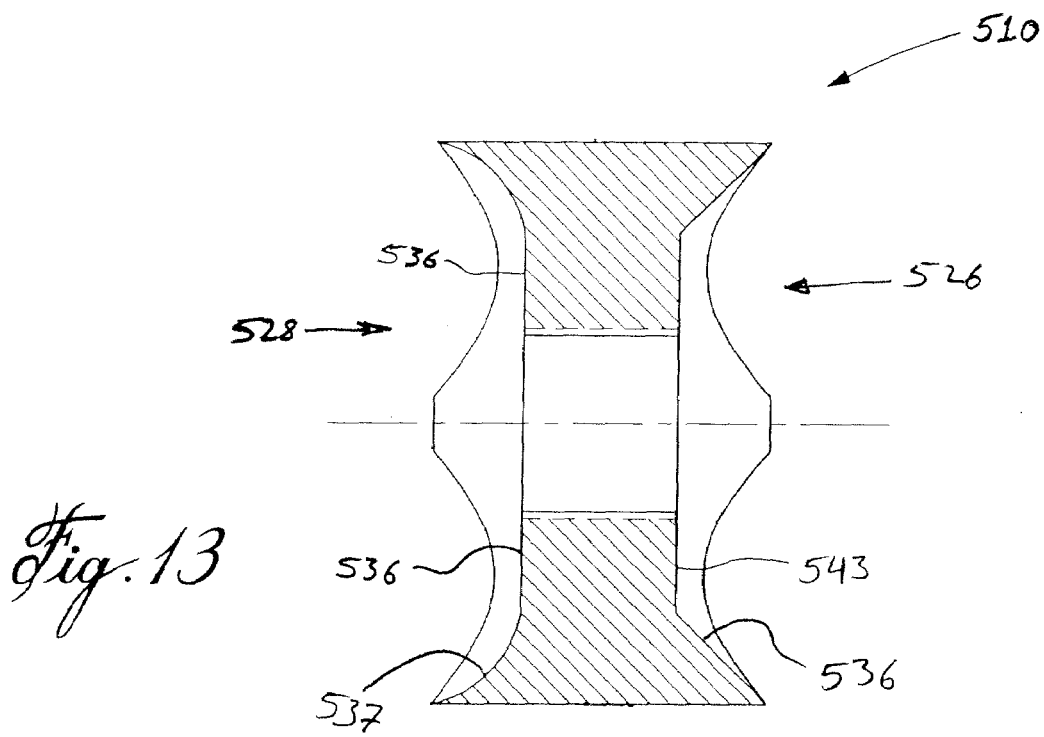
FIG. 13 is a cross-sectional view of a saw tooth in accordance with an alternate embodiment of the present invention.

Referring to FIG. 13, a cross-section of a saw tooth 510 in accordance with another alternate embodiment of the present invention is shown, wherein the opposed first and second cutting faces 526 and 528 of the tooth differ from each other (i.e. are not identical as per the opposed cutting faces of the other saw teeth described above). It is to be understood that all of the above-mentioned teeth 10, 210, 310, 410 can similarly include first and second cutting faces thereof which differ, whether slightly or more significantly, from each other. The saw tooth 510 of FIG. 13 includes a first cutting face 526 which includes an annular inner surface portion 543, which may be substantially parallel to a central transversal plane extending through the body of the tooth, and a substantially flat (but inclined relative to the inner surface portion 543) frustoconical outer surface 536 disposed radially outward therefrom. The opposed second cutting face 528, in contrast, includes a similar annular inner surface portion 543 which is substantially parallel to the same surface 543 on the first cutting face 526. The radially outer surface of the second cutting face 528, however, comprises a curved frustoconical surface 537. Both the curved frustoconical surface 537 of the second cutting face 528 and the flat (but inclined) frustoconical surface 536 of the first cutting face 526 extend about the full periphery of the respective cutting face.

Figure 14:
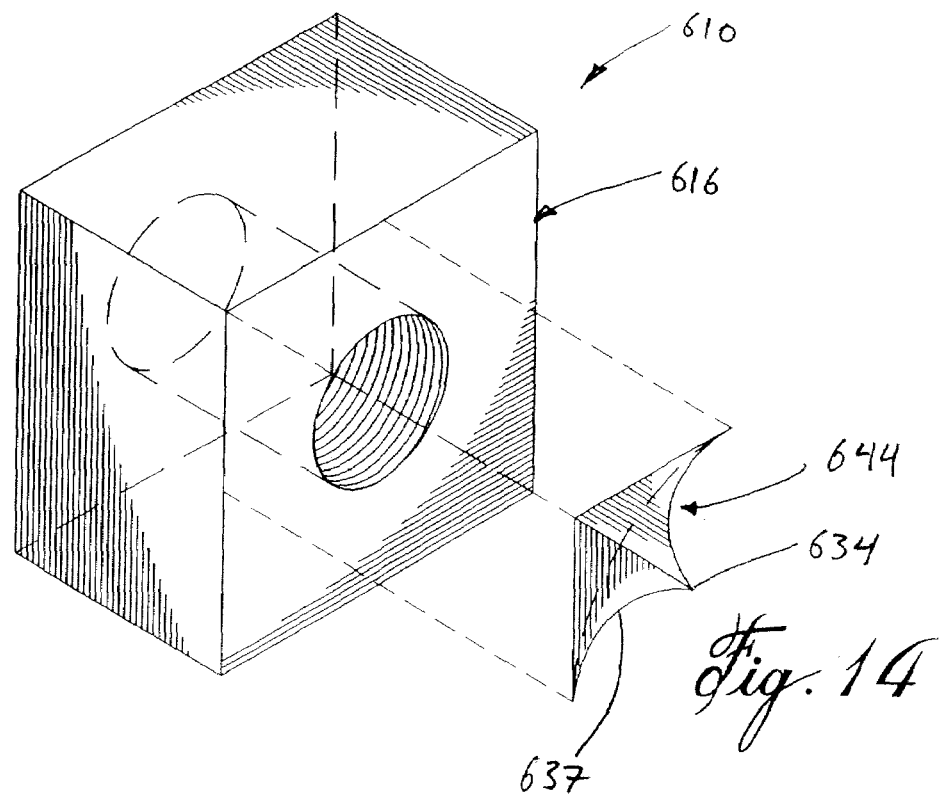
FIG. 14 is a perspective view of a saw tooth in accordance with an alternate embodiment of the present invention.

FIG. 14 shows a saw tooth 610 in accordance with another possible alternate construction, in which rather than being formed of a single block of metal from which the various faces, edges, surfaces, etc. are formed, the cutting faces are created by adding outwardly extending prisms 644 (whether triangular, or otherwise) onto a core body 616 of the saw tooth. Each prism 644 includes a cutting edge (or tip) 634 thereon, as well as at least one raking edge 637. Although only a single such prism 644 is depicted in FIG. 14, four of these may be fastened to the main core body 616 on each of the two opposed surfaces of the body which will become the opposed first and second cutting faces.

Figure 15:
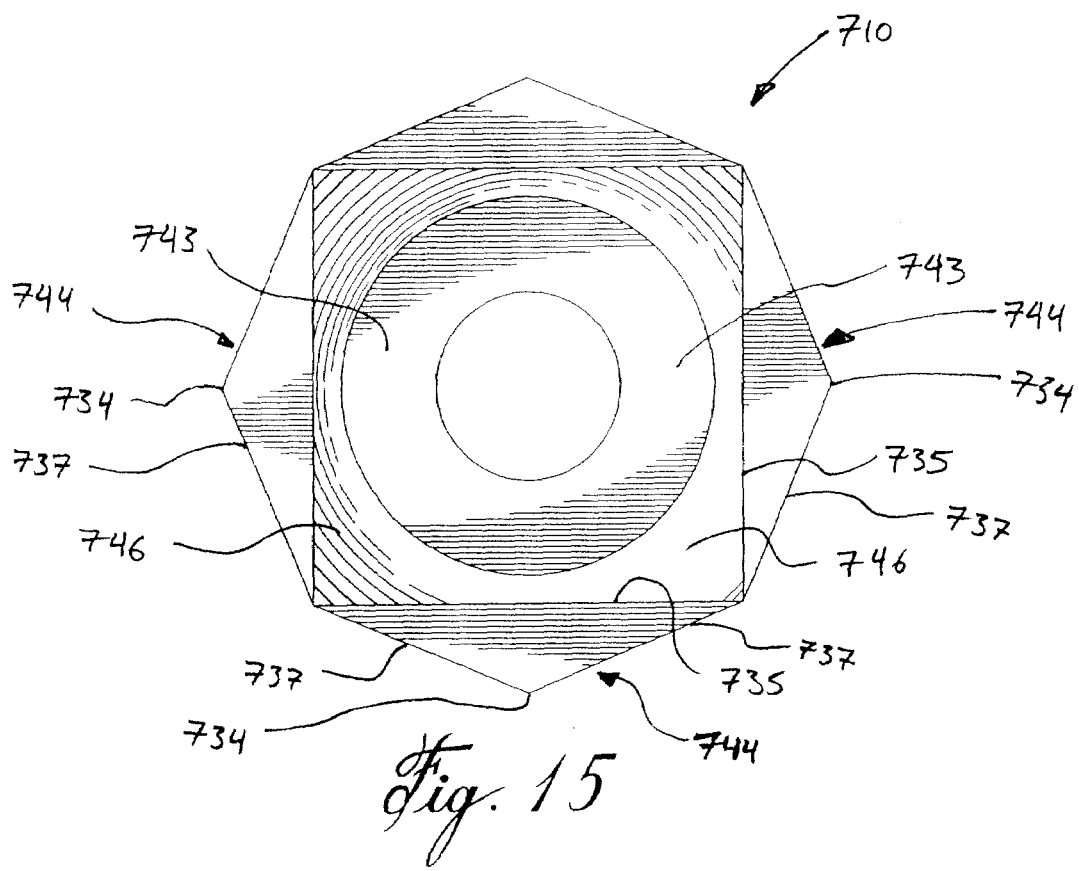
FIG. 15 is a front elevation view of a saw tooth in accordance with an alternate embodiment of the present invention.

FIG. 15 depicts a saw tooth 710 in accordance with another alternate embodiment, which has opposed cutting faces that each include a first annular inner surface 743 which may be either flat (i.e. substantially devoid of curvature) or curved (either concavely or convexly), and which surrounds the central aperture or bore 738 defined in the tooth 710. A second inner surface 746 is disposed radially outwardly from the first inner surface 743, and may be substantially frustoconical and extend about the full perimeter of the annulus defined by the first inner surface 743. The saw tooth 710 further includes outwardly projecting cutting prisms 744, but which are disposed along the side edges 735 defining the perimeter of the square tooth body within which the first and second inner surfaces 743, 746 are defined on each of the opposed cutting faces. Each of these substantially triangular protruding prisms 744 includes a cutting edge or cutting tip 734 and at least one (but generally two) raking edges 737.

Referring now to FIGS. 17 and 18, two alternate saw tooth holders 112 and 212 are shown, which are similar to the saw tooth holder 12 described above, however include adaptor portions 114 and 214, respectively, directly integrated therewith on the seat surfaces 124 and 224. In other words, the shape and configuration of the adapter (particularly that of the outer face thereof) is integrally formed into the surface 124, 224 of the saw tooth holders 112,212. Thus, the saw tooth used in conjunction with the tooth holders 112 and 212 is mounted directly onto the adaptor portions 114 and 214 thereof, using a fastener as required, within the need for a separate adaptor 14.

Figure 19:
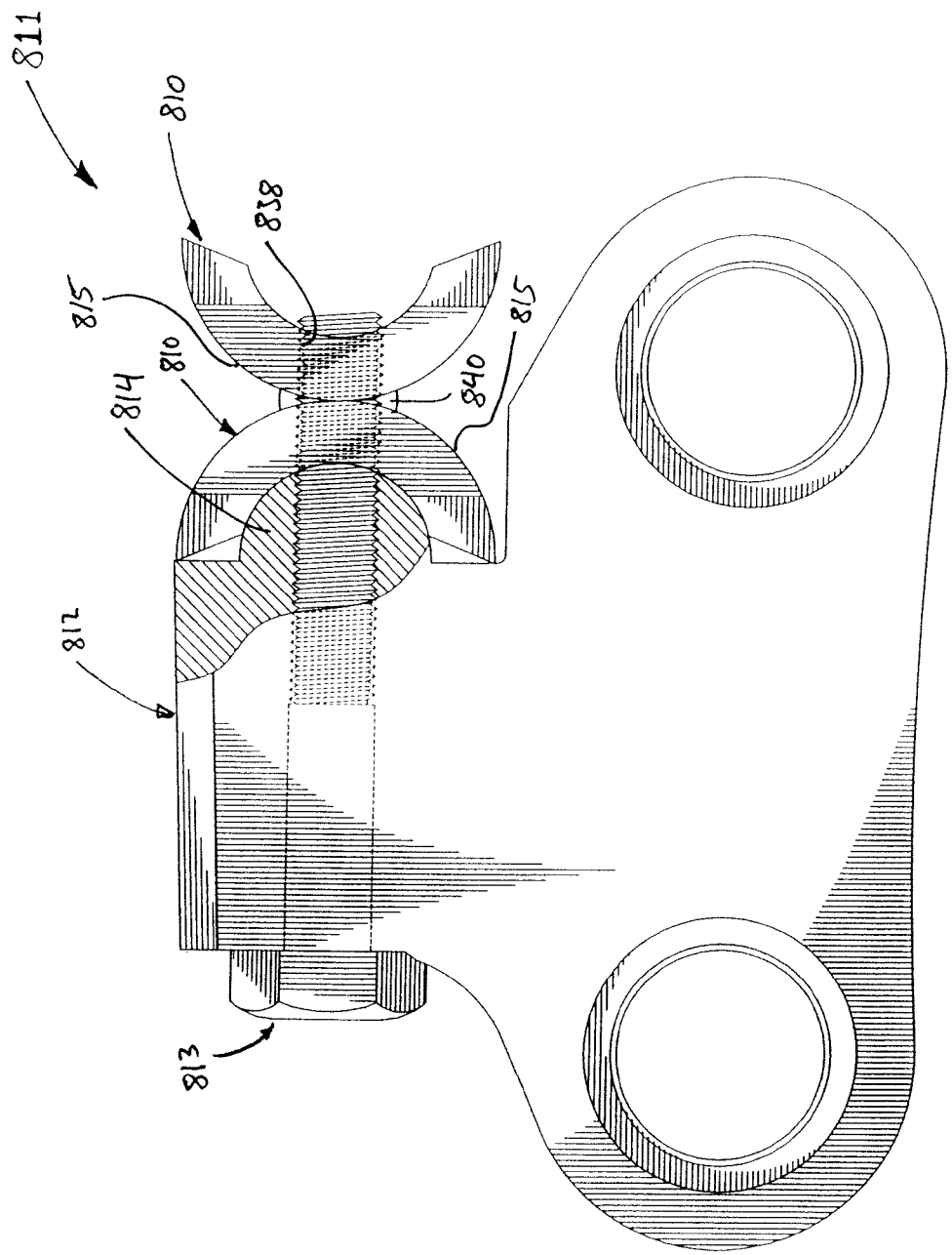
FIG. 19 is a partially sectioned, side elevation view of a saw tooth assembly in accordance with an alternate embodiment of the present invention.

Referring to FIG. 19, a saw tooth assembly 811 in accordance with another alternate embodiment of the present invention is shown, and includes generally a saw tooth holder 812 to which a pair of saw teeth 810 are fastened using a bolt 813. The adapter portion 814 is integrated directly into the body of the saw tooth holder 812 and is configured to correspond to the shape and configuration of the cutting faces of the saw teeth 810 such that these may be fastened securely to the body of the saw tooth holder. In this embodiment, two saw teeth 810 are provided and either integrally formed together or merely being distinct individual saw teeth which are abutted back to back when fastened in place on the saw tooth holder. Each of the saw teeth 810 comprises a substantially C-shaped cross-sectional shape which extends horizontally to define a curved half pipe-shaped tooth. A central bore 838 is defined through each of the saw teeth 810 through which the bolt 813 extends for removably fastening the saw teeth to the holder. An intermediate mounting member 840 may also be provided between each of the abutted rear surfaces 815 of the curved saw teeth 810 such as to more securely interlock the abutted curved surfaces together when fastened in place on the holder. As per the replaceable saw teeth described above, each saw tooth 810 may be rotated (for example, by 180° about the axis of the bolt) such as to expose at least another cutting edge thereof in the operative cutting position. When all cutting edges on the forward cutting face saw tooth 810 are dulled and/or the when desired or required, the forward saw tooth may either be removed and replaced or both saw teeth 810 mounted to the holder may be disengaged therefrom by loosening the attachment bolt 813 and the pair of saw teeth 810 are reversed as described above such as to switch positions of their respective cutting faces in order to place a new cutting face of the other saw tooth in the operative cutting position.

Figure 20:
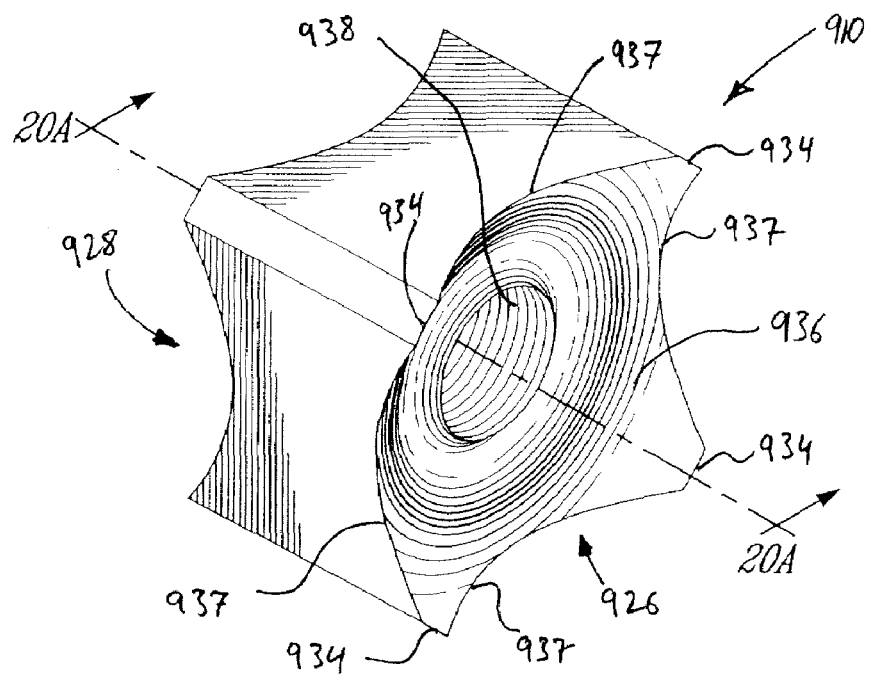
FIG. 20 is a perspective view of a saw tooth in accordance with an alternate embodiment of the present invention.
Figure 20A:
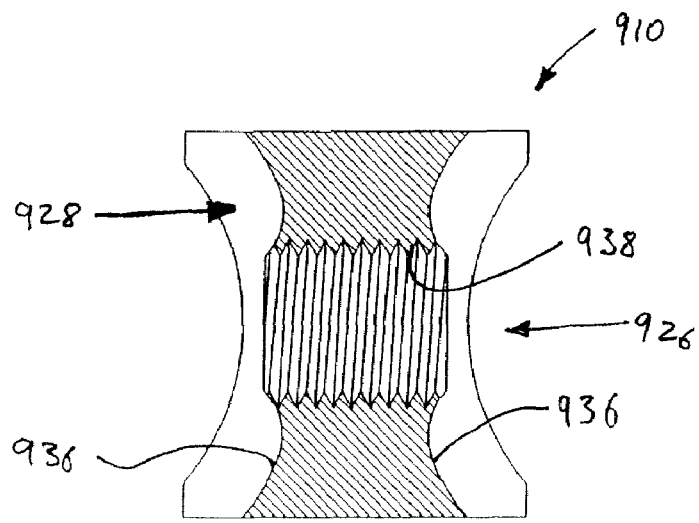
FIG. 20A is a cross-sectional view of the saw tooth of FIG. 20.

FIG. 20 depicts a saw tooth in accordance with another alternate embodiment of the present invention. Particularly, saw tooth 910 is very similar to the saw tooth 210 as described above and depicted in FIGS. 7 and 8, however the configuration of the opposed cutting faces 926 and 928 are slightly different. In particular, referring to the visible cutting face 926 in FIG. 20, each cutting face includes a curved outer surface portion 936 which extends about the full periphery of the cutting face within the outer cutting and raking edges and extends radially inward all the way to the central bore 938 defined through the center of the cutting tooth 910. Accordingly, no additional or distinct inner surface portion exists as per some of the other saw teeth described above. As best seen in FIG. 20A, this curved outer surface portion 936 of the cutting faces 926 and 928 defines a non-constant radius of curvature such that the outermost (i.e. furthest away from the central bore 938) edges of the surface 936 are more steep and thus define a smaller radius of curvature and as the surface 936 extends towards the central bore 938, this radius of curvature increases such that the curve begins to flatten out (however, never fully defines a completely flat surface) before increasing in slope again upwards towards the central bore 938. Accordingly, the effect is that the entrance to the central bore 938 is slightly raised relative to the lowest-most point of the curved outer surfaces 936 of each cutting face.

Referring now to FIG. 21, the saw tooth assembly 1011 includes a saw tooth holder 1012 to which a saw tooth 1010 is mounted via an intermediate adapter 1014. In this embodiment, the adapter portion 1014 is either permanently fastened or integrally formed with the saw tooth holder 1012, and the saw tooth 1010 is removably fastened to the holder 1014 via a fastening member 1013 which protrudes from each of the opposed cutting faces 1026 and 1028 of the saw tooth 1010.

The fasteners 1013 protruding from each of the opposed cutting faces can either be opposite ends of a common threaded fastener extending through a central bore of the saw tooth, or alternatively can be individual threaded fasteners which protrude outwardly from each of the cutting faces and to which each is permanently engaged, whether by welding, etcetera. Thus, in order to mount the reversible saw tooth 1010 to the holder 1012, it is rotated such as to thread the fastener 1013 into the mating threaded bore 1038 defined within the adapter portion 1014. Accordingly, the adapter portion 1014 includes a rounded or curved outer surface such as to be able to permit the rotation of the saw tooth until it is fully abutted thereagainst. Thus, in this embodiment further clearance is provided between the bottom of the saw tooth lower face 1032 and the opposed surface 1025 defined on the holder in the opening or seat portion within which the tooth is received. However, as described with respect to the embodiment of the saw tooth assembly 11 shown in FIG. 2, the saw tooth 1010 is preferably provided with an outwardly inclined angle of attack such as to permit clearance on the radially outermost face 1032 of the saw tooth for the kerf. Thus, the distance D2 defined between the holder surface 1025 and the forward edge of the saw tooth 1010 is greater than the distance D1 defined between this surface 1025 and an innermost edge of the saw tooth and the holder 1014 to which it is abutted, thereby providing a slight outward inclined angle to the saw tooth such as to create kerf clearance on the outer surface of the saw tooth.

FIG. 22 depicts an embodiment similar to that of FIG. 21, however the adapter 1114 is removably fastened to the holder 1112, such as by a rearwardly mounted bolt 1113 which extends through the central body of the holder and into a mating threaded opening 1117 defined in the adapter. The saw tooth 1010 mounted to the adapter 1114 is otherwise similar to that previously described with respect to FIG. 21.

Figure 23:
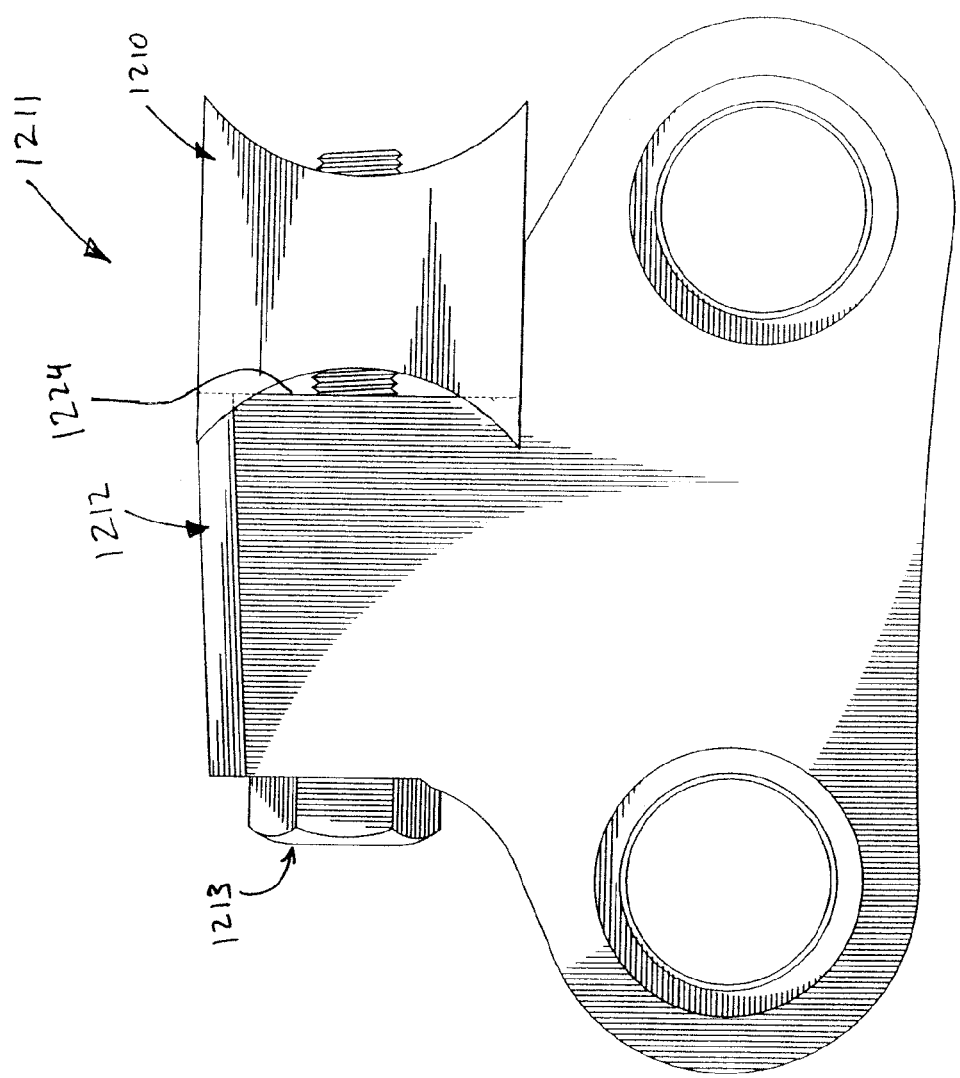
FIG. 23 is a side elevation view of a saw tooth assembly in accordance with an alternate embodiment of the present invention.

In the embodiment of FIG. 23, a saw tooth assembly 1211 is shown, which includes a saw tooth 1210 which is mounted directly to a corresponding saw tooth holder 1212 using a suitable fastening means, such as the rearwardly mounted bolt 1213 which extends through the body of the holder and through a central bore defined in the saw tooth in order to fasten same to the holder. In this embodiment, the holder is provided with seating faces 1224 which are shaped and configured such as to receive at least a portion of the cutting face of the saw tooth abutted directly thereagainst when the saw tooth 1210 is mounted to the holder. Thus, these seating faces 1224 are curved and provide a cut-out for receiving the outermost inner surface portions of the cutting face as well as the cutting and raking edges thereagainst.

Figure 24:
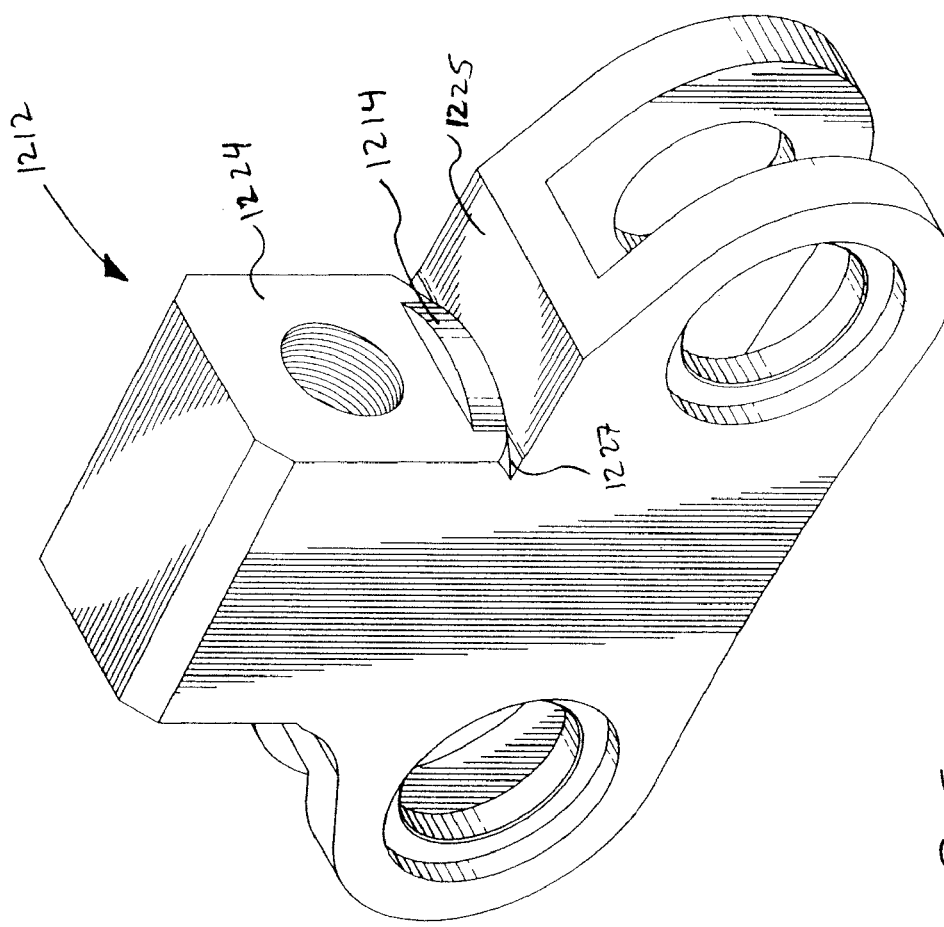
FIG. 24 is a perspective view of a saw tooth holder in accordance with an alternate embodiment of the present invention.

FIG. 24 depicts the saw tooth holder 1212 to which the saw tooth 1210 is fastened, the holder 1212 includes a smaller adapter portion 1214 at the lower edge of seating face 1224 which is used to mate with the correspondingly opposed surfaces of the saw tooth's cutting face, such that the saw tooth 1210 can be mounted directly to the holder in a secure manner. As noted above, cut-outs 1227 at the outer mating edges of the seating surfaces 1224 and 1225 are provided such that the inner cutting tips or edges of the saw tooth do not interfere with the holder during mounting of the cutting tooth or during use of the entire saw tooth assembly.

Figure 25:
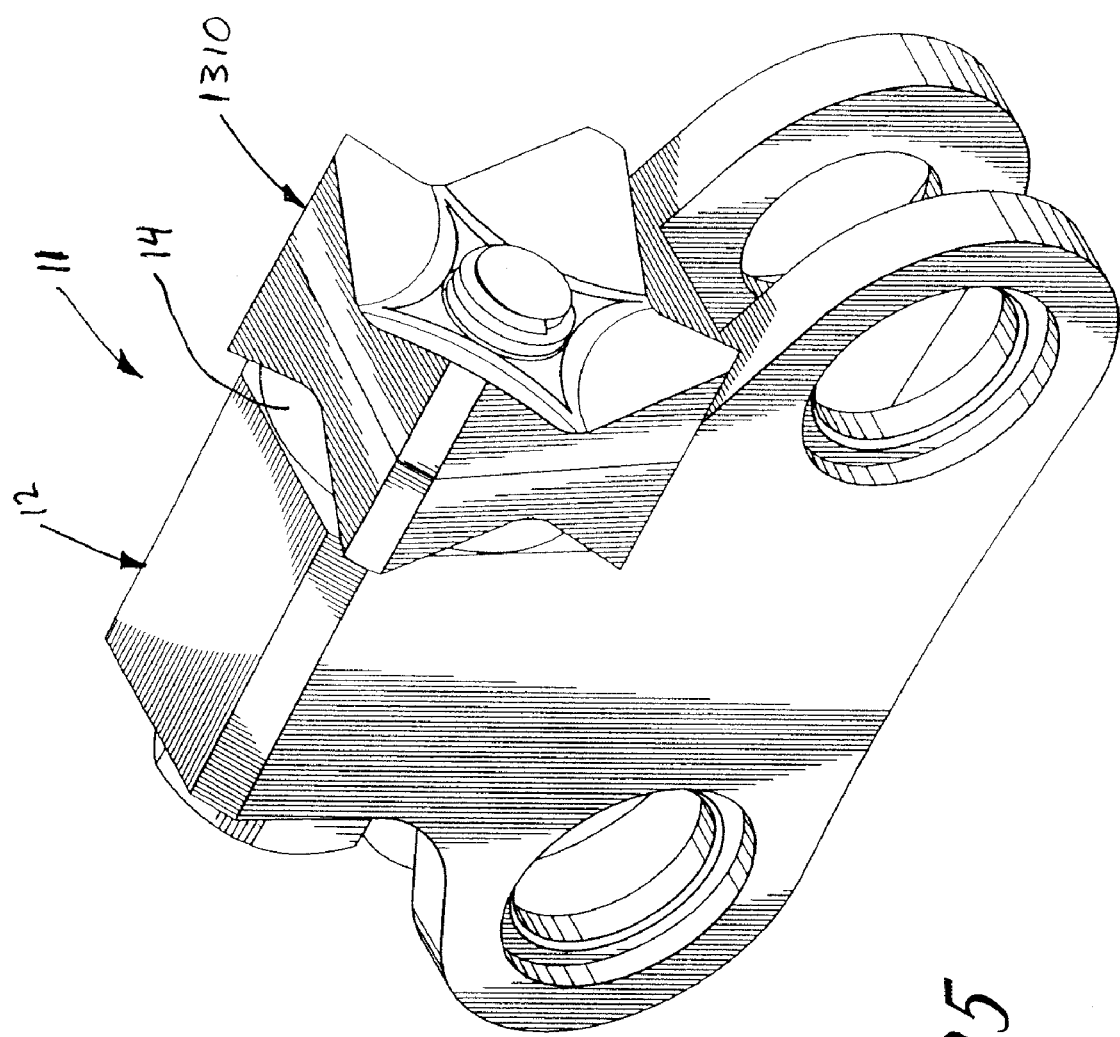
FIG. 25 is a perspective view of a saw tooth assembly in accordance with an alternate embodiment of the present invention.

FIG. 25 depicts the saw tooth assembly 11 as previously described and depicted in FIGS. 2-5. However, the saw tooth 1310 mounted thereto is slightly different from the saw tooth 10 as described above, in that the saw tooth 1310 is formed of two halves which abut together back to back before being fastened to the saw tooth holder 12 via the corresponding adapter 14. As described above with respect to the saw tooth 410 shown in FIG. 12A, the saw tooth 1310 is formed of two identical halves which interlock and/or abut together to form the full saw tooth. Thus, either the whole saw tooth or only one half thereof may be rotated as desired such as to expose a different cutting edge in a principle operative cutting position, and as described above, the entire saw tooth may be detachable from the holder and reversed such as to expose the second cutting face having the four cutting edges thereon. Although the saw tooth 1310 is preferably split into two equal halves in a transversal plane approximately midway between the first and second cutting faces of the saw tooth, it is to be understood that the saw tooth could alternately be split into two or more portions of differing sizes provided that they correspond to one another and abut and/or interlock such as to create a whole saw tooth having cutting faces on at least opposed first and second faces thereof.

Figure 26:
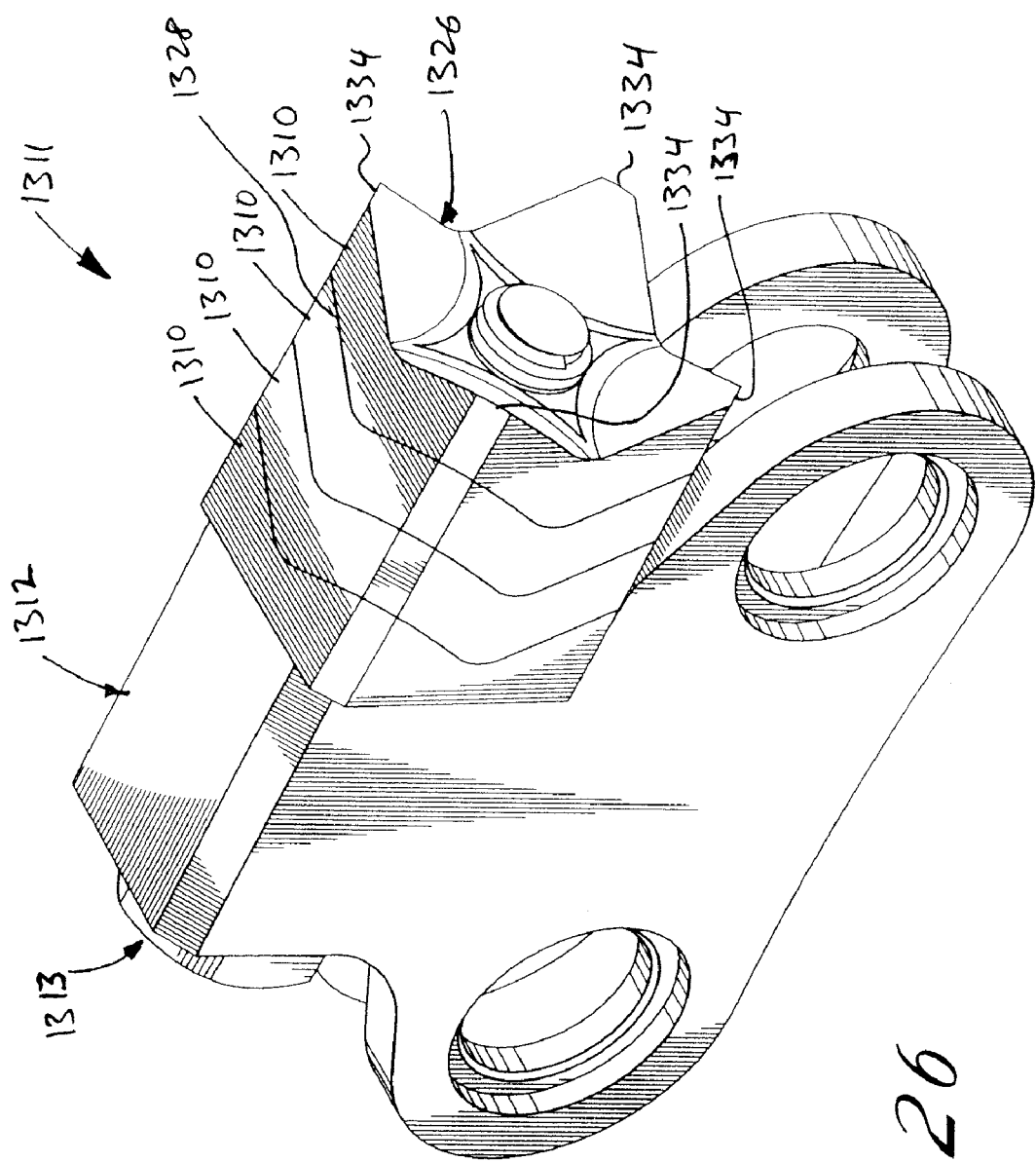
FIG. 26 is a perspective view of a saw tooth assembly in accordance with an alternate embodiment of the present invention.

FIG. 26 depicts an alternate saw tooth assembly 1311 which includes a saw tooth holder 1312 to which are removably fastened a plurality of saw teeth 1310 which interlock to form a stacked set of saw teeth which can all be mounted to the saw tooth holder via a suitable fastener such as a bolt 1313. Each of the saw teeth 1310 may in fact only comprise a single cutting face 1326 which includes at least more than two cutting edges thereon and, in a more preferable embodiment, four cutting edges 1334 thereon at each of the four outer corners of the generally square cutting tooth 1310. The cutting faces 1326 are as described above with respect to the saw tooth 10, however rather than having an opposed and mirror image cutting face on the tooth, the rear tooth face 1328 defined on the other side of the saw tooth from the forward cutting face 1326 is in fact shaped and configured such as to be able to mate and abut against the next opposed cutting face 1326 of the next saw tooth 1310. Thus, this creates a stacked set of saw teeth, each of which can be rotated such as to expose a different one of the cutting edges thereon in an operative cutting position. When the outermost saw tooth 1310 is dulled, damaged, or it is otherwise desired to replace same, the foremost saw tooth can simply be removed (i.e. completely disconnected from the remainder of the stacked saw teeth), thus exposing the subsequent unused saw tooth 1310 at the top of the stack. This removed tooth is then replaced at the rear of the stack before the indexed stack of teeth is then re-placed on the holder and re-fastened thereto. Referring now to FIG. 27, a portion of a saw disk 415 is shown which includes a plurality of saw tooth holders 412 integrally formed directly thereon (rather than being separate elements fastened thereto such as for the saw tooth holder 12 described above). To each of the integral saw tooth holders 412 is similarly mounted a saw tooth 10, either with or without an intermediate adapter 14.

Figure 28:
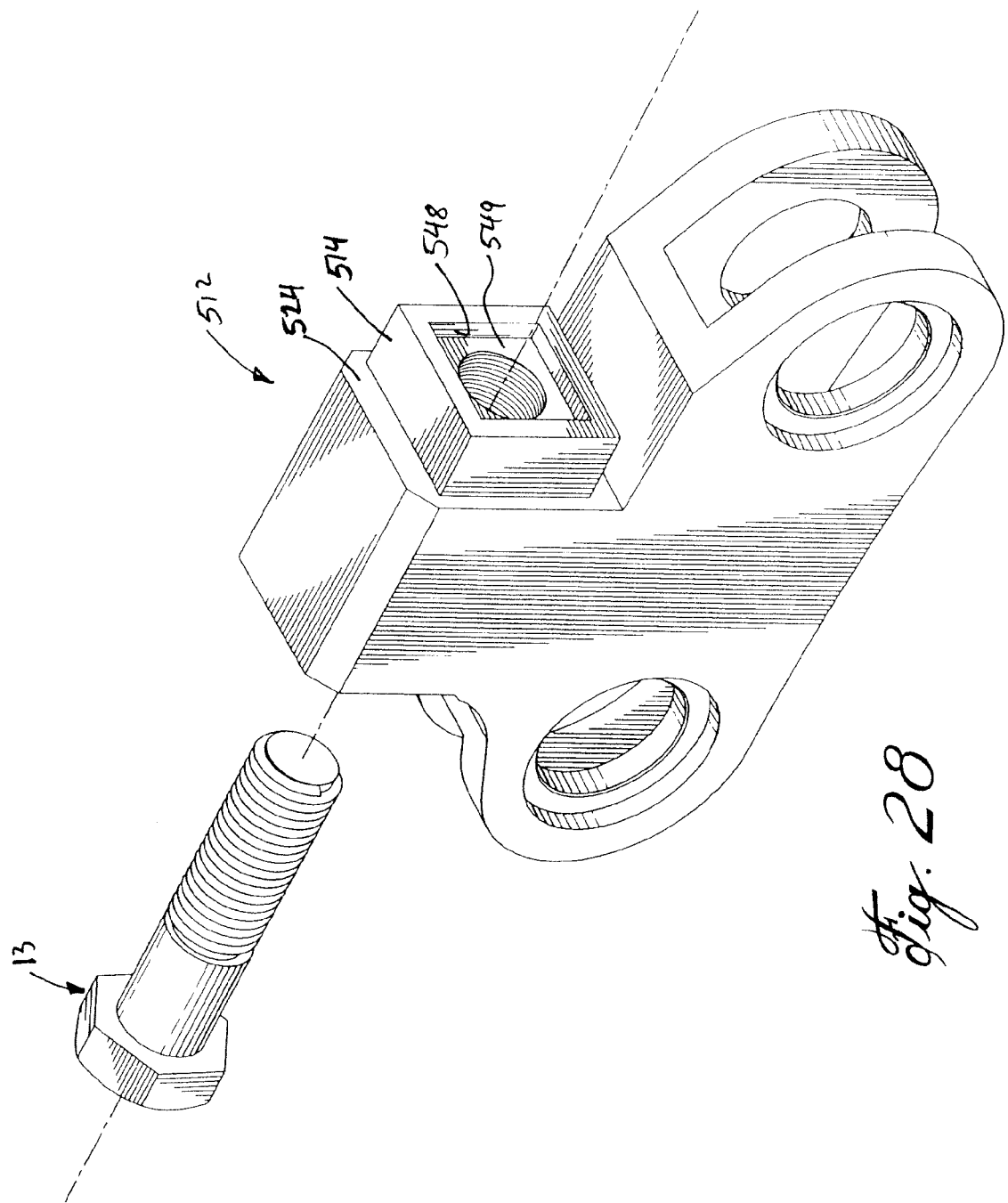
FIG. 28 is a perspective view of a saw tooth holder in accordance with an alternate embodiment of the present invention.
Figure 29:
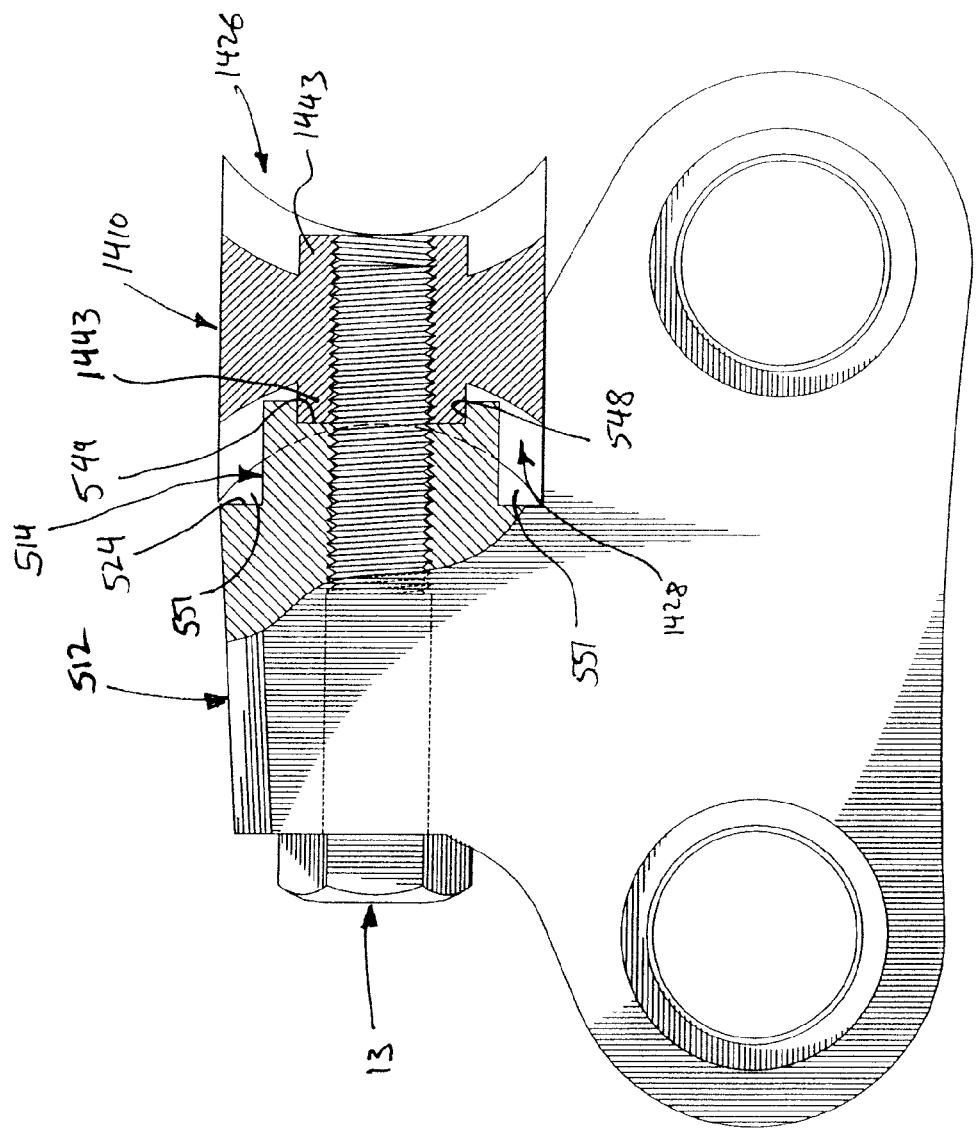
FIG. 29 is a partially sectioned, side elevation view of a saw tooth assembly in accordance with an alternate embodiment of the present invention.

Referring now to FIG. 28, an alternate saw tooth holder 512 is depicted which includes an adapter portion 514 integrated therewith on the generally radially extending seat surface 524 against which the saw tooth is fastened via a suitable fastener such as bolt 13. The adapter portion 514 integrated with the holder 512 generally defines a substantially square shape having a central square recess 548 defined therein within which a portion of the saw tooth is received when mounted to the saw tooth holder. A central threaded bore extends through the body of the saw tooth holder as per the previously described holders above, such that the bolt 13 may fasten the reversible saw tooth to the saw tooth holder 512. Within the recess 548 of the adapter portion 514 is defined an inner substantially flat surface 549 against which a mating surface of the saw tooth is abutted as shown in FIG. 29. Therefore, the saw tooth 1410 employed with the saw tooth holder 512 includes a correspondingly shaped and configured central shank portion 1443 which is adapted for mating within the square recess 548 of the adapter portion 514 when the saw tooth is fastened to the holder. Therefore, as both the shank portion 1443 and the mating recess 548 within which it is received are both, at least in this embodiment, provided with a substantially square configuration, these two portions interlock such as to help prevent unwanted rotation of the saw tooth 1410. The adapter portion 514 protrudes outwardly from the seat surface 524 such as to create inner and outer clearance gaps 551 within which are received the cutting edges of the saw tooth such as to prevent unwanted contact between the saw tooth edges and/or cutting face and the tooth holder during operation of the entire assembly. As seen in FIG. 29, the saw tooth 1410 is similar to the saw tooth 410 as described above, however with the addition of the protruding central shank portion 1443 on both of the opposed cutting faces 1426 and 1428. Although the central shank portion 1443 as depicted is substantially square for receipt into the correspondingly shaped recess 548 in the associated adapter 514 of the saw tooth holder 512, it is to be understood that alternate configurations may be provided as long as the mating shank and recess and/or opening in the adapter or holder are complimentary and similarly configured such that they can securely mate one within the other. Although in this embodiment the protruding shank is provided on the saw tooth and is received within the recess or opening within the holder, the converse may also of course be provided wherein the protruding shank is disposed on the adapter and/or holder and which is received within a correspondingly sized and shaped opening in the cutting face of the saw tooth about the central bore thereof.

Figure 30:
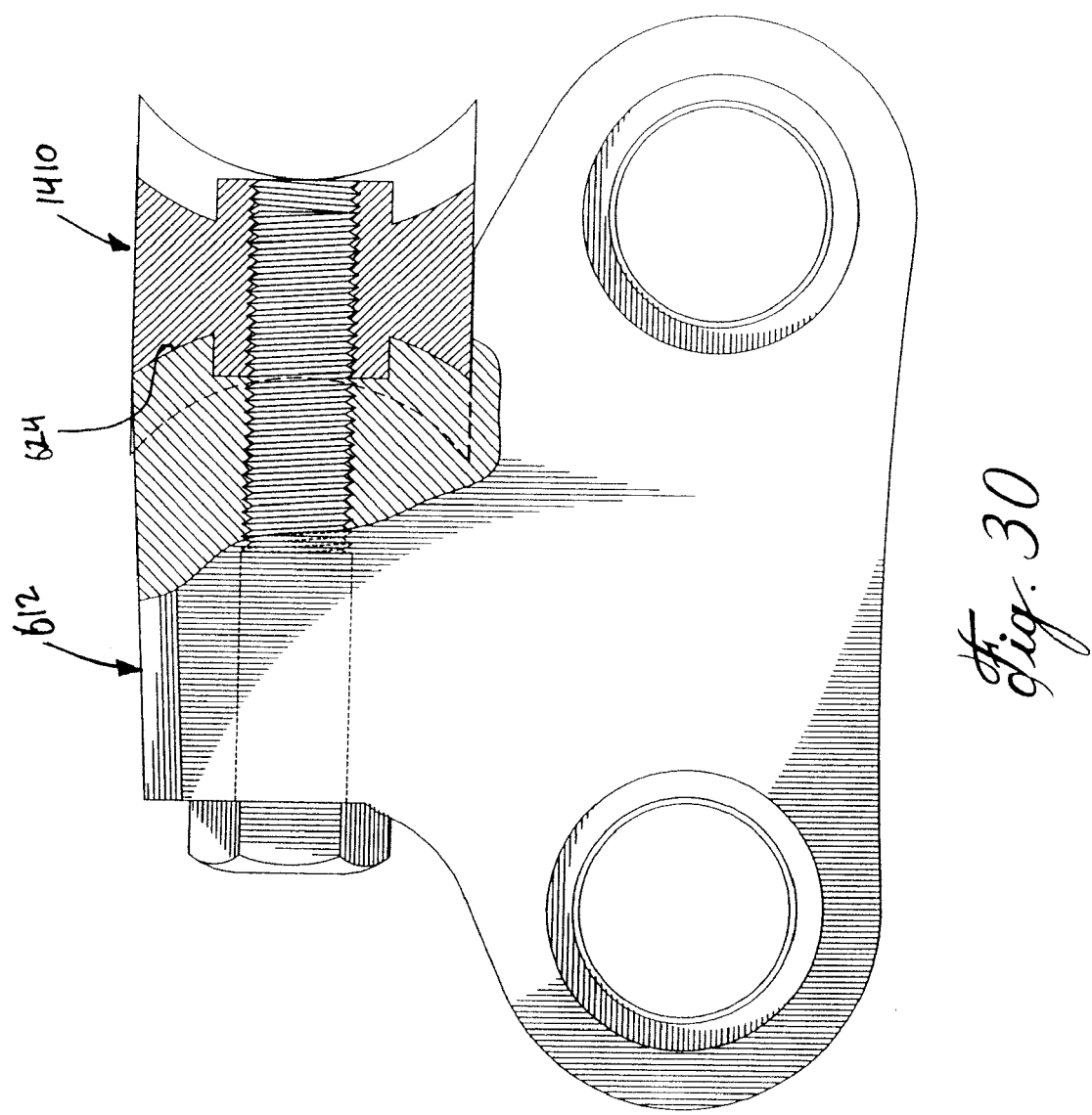
FIG. 30 is a partially sectioned, side elevation view of a saw tooth assembly in accordance with an alternate embodiment of the present invention.

FIG. 30 depicts a saw tooth holder 612 which is a slight variant of the holder 512 depicted in FIGS. 28 to 29. The saw tooth holder 612 similarly receives a saw tooth 1410 for fastening thereto, however the seating surfaces 624 are configured slightly differently such that the entire cutting face is abutted against and within the saw tooth holder 612 when fastened thereto. Accordingly, greater contact between the inner cutting face approximate the holder and the seating surfaces 624 exists. Thus, no separate adapter portion is provided as the seating surfaces of the holder 612 are shaped and configured such as to snugly receive the saw tooth therein.

FIGS. 31 and 32 depict another alternate embodiment of the present invention, particularly comprising a saw tooth assembly 1511 which includes a saw tooth 1510 and its associated saw tooth holder 1512. Although not shown, a suitable fastener such as a bolt previously described may be used to removably fasten the saw tooth 1510 to its holder 1512 via a suitable adapter 1514. The saw tooth 1510 is reversible includes opposed first and second cutting faces 1526 and 1528 respectively. In contrast to the majority of the above-described saw teeth however, the saw tooth 1510 comprises a substantially cylindrical configuration with the first and second cutting faces disposed at either end thereof. Each of the first and second cutting faces 1526, 1528 thus defines a single, substantially circular, and continuous cutting edge 1534 which extends about the full periphery of each of the cutting faces. The saw tooth 1510 remains reversible, in that when all or a portion of the single continuous cutting edge 1534 on the exposed cutting face is worn, damaged or wished to be replaced, the entire saw tooth 1510 may be disengaged from the holder 1512 and inverted such that the other of the first and second cutting faces (previously inwardly facing towards the holder) is now exposed and positioned in an outer operable cutting position when the saw tooth is replaced back on the holder. Further, much as the above-described saw teeth can be rotated up to four times such as to expose a different one of the four cutting edges in an operative cutting position, the saw tooth 1510, given its circular configuration, can be rotated almost an infinite number of times about its central axis extending through the through or central bore 1538 thereof such as to expose a different portion of the continuous circular cutting edge 1534 in a position relative to the holder which performs the majority of the cutting action. Thus, as each arcuate portion of the cutting edge 1534 is worn, the tooth may be slightly rotated such as to expose the next circumferentially adjacent arcuate portion of the same cutting edge 1534 in the operable or most effective cutting location relative to the holder. This procedure can thus be repeated until such time as the cutting edge 1534 has been worn about its full circumference, at which point the whole saw tooth 1510 can then be inverted as described previously such as to dispose the circular cutting edge on the other cutting face for use. Each of the first and second cutting faces 1528 and 1526 includes a substantially curved inner surface 1536 which extends radially inward from the outer cutting edge 1534 towards the central bore 1538. A central annular substantially flat portion 1543 of the inner surfaces of the cutting face may also be provided about the central bore 1538.

All of above-described tooth holders, whether integrated into the saw disk or mounted thereon, may be configured such that they accept (i.e. are able to have removably mounted thereto) either a reversible or double-sided saw tooth as described herein or a standard (i.e. single-sided) saw tooth having only a single cutting face thereon for fastening thereto. Accordingly, the seating surfaces of the saw tooth holder to which the saw teeth are mounted may be configured such that a standard single-cutting face saw tooth may be abutted directly thereagainst and fastened in place to the holder, while a reversible saw tooth as described above may also be fastened thereagainst, whether using an intermediate adaptor or not.

Figure 33:
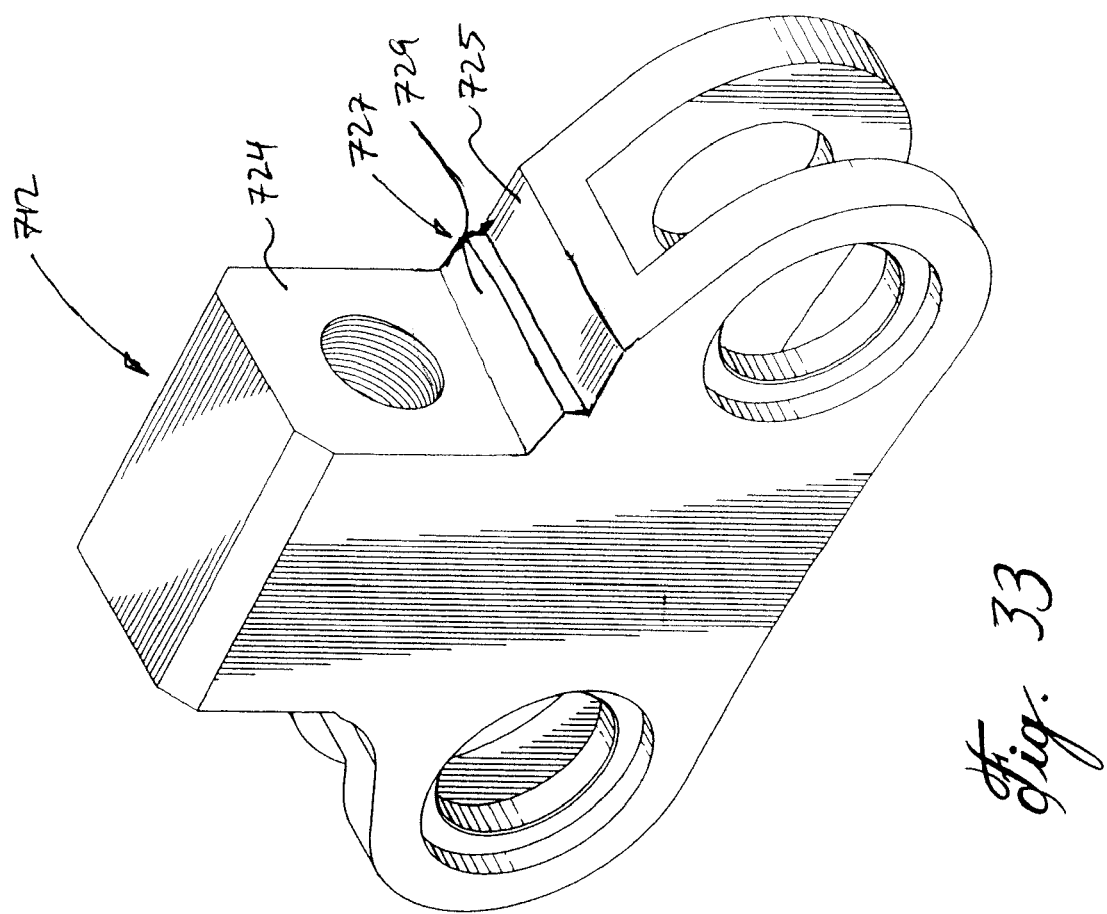
FIG. 33 is a perspective view of a saw tooth holder in accordance with an alternate embodiment of the present invention.

In at least one such embodiment, a tooth holder 712 as depicted in FIG. 33 is so configured to be able to accept either a standard (i.e. one-sided) saw tooth or a reversible saw tooth as described above. The saw tooth holder 712 includes a step 727 disposed at the inner end of the seat surface 724 at the junction of the seat surface 25 which may be perpendicularly disposed relative to the surface 724, and which together define an opening therebetween within which the saw tooth is received for fastening to the holder. This step 727 extends the full width of the opening defined between these perpendicular surfaces 724 and 725. As noted above, while these seats 724,725 on the holder 712 are disposed in two perpendicular planes, these may each be respectively inclined relative to a radial and tangential axis of the circular saw disk to which the holder 712 is mounted, which may in a particular embodiment correspond to the radial and tangential axis of the holder when in use, such as to create a slight forward kerf clearance for the cutting edges of the tooth. In at least one embodiment, however, the radially outer surface 729 of the step 727 may also inclined relative to the seating surface 725, such as to permit the retro-fit of a standard (i.e. one sided) saw tooth which may have an overall tapered configuration (i.e. truncated pyramidal shape) between a base end thereof and the opposed cutting face. The step 727 thus permits the inner cutting edges of the standard saw tooth to clear (preferably without touching) the seating surface 725 without interference being caused therebetween. Thus, the outwardly inclined angle of attack (i.e. a forward clearance attack angle of between about 0 and 5 degrees for example) may thus be maintained for a standard tooth when used with the holder 712 which can also accommodate reversible saw teeth of the present invention. When such a reversible saw tooth is to be mounted to the holder 712, a corresponding adapted may be employed which has at least a portion thereof which is shaped and configured to complement and correspond to the step 727, such that a rear surface of the holder may nevertheless abut the rear seating surface 724 of the holder, without the step 727 interfering with this abutment. This may include, for example, a cut-out region corresponding to the step 727, taper side walls corresponding to the inclination (if any) of the step 727 relative to the two perpendicular seating surfaces, etc. For example, the adaptor employed may have a reverse taper thereon at a rearward end thereof, which is adapted to abut the inclined step 727, and forward portion which is configured for mating with both of the opposed cutting faces of the saw tooth in question. The adapter may also be stepped itself, having a first side wall portion which is adapted to sit on the step 727 of the holder, and another side wall portion which is adapted to overly the base seating surface 725. It is understood that regardless, the rear face of the adapter is configured to abut against the rear seating surface 724 of the holder, and includes a bore therethrough as necessary for the attachment of the saw tooth and adapter to the holder. It is also to be understood that the step 727 may also be 90 degrees relative to each of the seating surfaces 725 and 724 (i.e. the step is not inclined).

Figure 34:
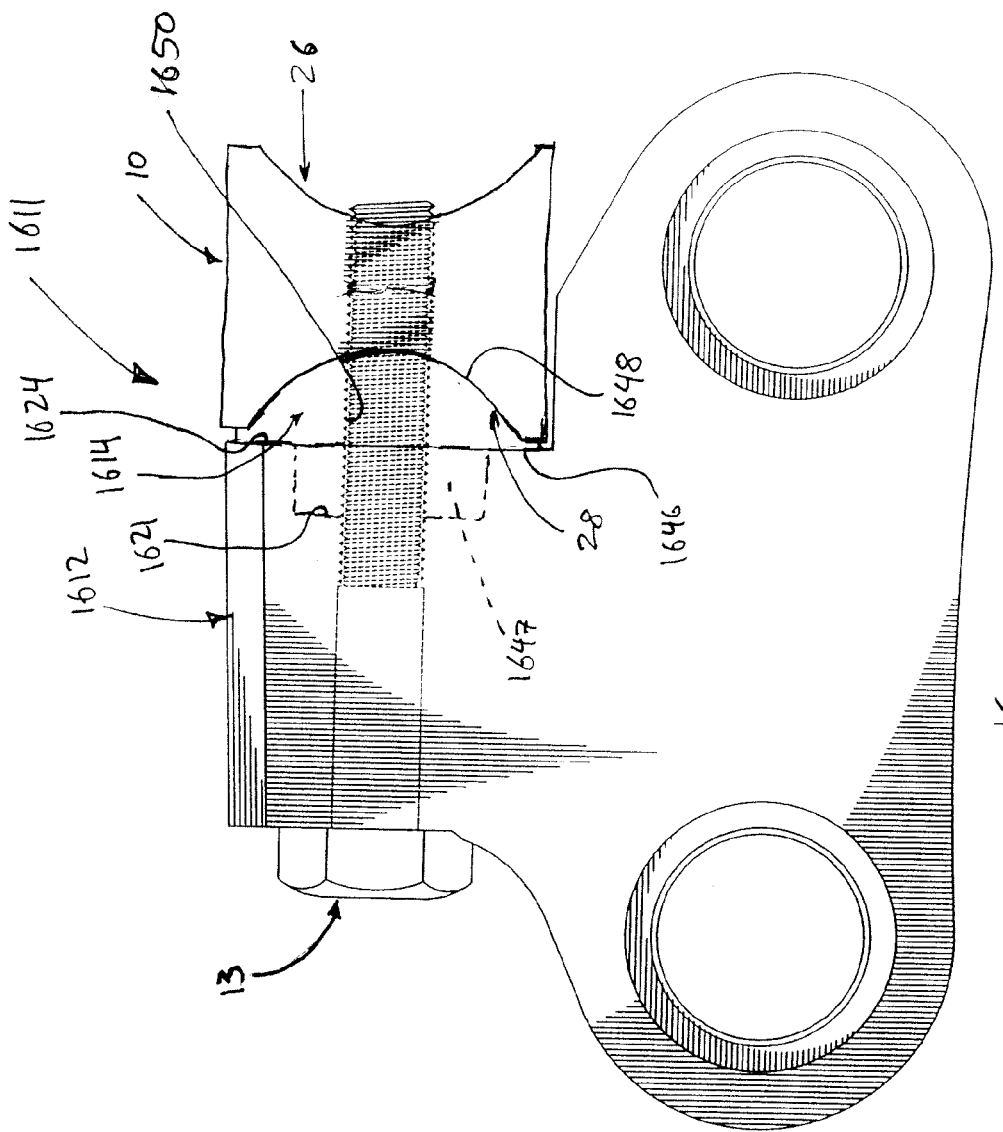
FIG. 34 is a side elevation view of a saw tooth assembly in accordance with an alternate embodiment of the present invention.

Referring now to FIG. 34, the saw tooth assembly 1611 in accordance with yet another embodiment is depicted. The saw tooth assembly 1611 includes a saw tooth holder 1612, an adapter 1614 and a saw tooth 10 as previously described. Of course, any of the other reversible saw teeth described hereinabove may similarly be used with the adapter 1614 and the holder 1612 of this embodiment. The saw tooth assembly 1611 differs from those above in that the adapter 1614 includes, on a side thereof oppose a forward face 1648 which is configured and complementary to the cutting faces 26 and 28 of the saw tooth 10, a rear shank 1647 which is disposed about the central bore 1650 extending through the adapter 1614, and protrudes rearwardly from a main rear surface 1646 of the adapter which is adapted to abut the seating surface 1624 of the holder. The central shank 1647 is thus adapted to extend into and be received within a corresponding opening 1621 defined within the holder 1612. The shank 1647 of the holder 1614 may be cylindrical, square or rectangular in cross-sectional shape, or may be similarly define any number of other polygonal cross-sectional shapes, both regular and irregular. The holder 1614 having such a shank 1647 provides improved strength to the overall assembly, thereby reducing the likelihood of the fastener 13 which retains the assembly together to bend or break in the event that the saw tooth and/or the entire saw disk to which the holder is mounted, strikes a rock or another hard object which can cause damage to the saw tooth assemblies of the rotary cutting machine's saw disk. Further, this configuration readily permits the reversible saw tooth 10 and the associated adapter 1614 to be removed, if desired, from the holder 1612 and replaced with a standard (i.e. a single-sided saw tooth having only one cutting face) saw tooth, which includes on a rear surface thereon a shank portion similar to the shank 1647 of the adapter 1614 for receipt within the corresponding opening 1621 of the holder 1612.

Although the saw teeth described above include opposed cutting faces which each include at least two cutting edges thereon (in most of the above described embodiments, for example, each cutting faces includes four cutting edges thereon). Although at least more than two cutting edges are provided on each cutting face of the present invention (for the embodiment of FIG. 32, the continuous circular cutting edges is considered to include a plurality of cutting portions about the full circumference thereof, and thus comprising more than a single cutting edge portion), it is to be understood that any number of cutting edges may be provided on each of the two cutting faces. For example, the cutting faces of the saw tooth may comprise an octagonal shape (wherein 8 cutting edges are defined on each of the two cutting faces), a hexagonal shape (where 6 cutting edges are defined on each of the two cutting faces), a pentagonal shape (where 5 cutting edges are provided on each of the two cutting faces), etc. Further, the cutting faces may be provided with non-regular polygonal shape, for example may comprise a rectangular shape (i.e. having four cutting edges on each of two opposed cutting faces). It is understood that in this embodiment, when the saw teeth are rotated about 180 degrees (i.e. about their central axes), they will remain in the same relative position with respect to the holder, however if they are rotated by 90 degrees they may protrude more or less (depending on the starting point) relative to the holder. Much as described above, regardless of the shape and configuration of the cutting face, the saw tooth remains invertible such as to expose the opposite cutting face and locate the cutting edges thereon in an operable cutting position.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

The invention claimed is:

1. A replaceable saw tooth adapted to be mounted to a tooth holder of a rotary cutting machine, the saw tooth comprising opposed first and second cutting faces respectively disposed on oppositely facing front and rear sides of the tooth, the first and second cutting faces being spaced apart along a central tooth axis extending between the first and second cutting faces on the front and rear sides, each of said first and second cutting faces at least partially defining more than two cutting edges, said cutting tooth being reversible by 180 degrees about a transverse tooth axis to dispose a selected one of said first and second cutting faces in an operable cutting position when mounted to said tooth holder, the transverse tooth axis being substantially perpendicular to the central tooth axis extending between said first and second cutting faces.

2. The saw tooth as defined in claim 1, wherein said first face defines four cutting edges thereon and said second face defines four additional cutting edges thereon.

3. The saw tooth as defined in claim 1, wherein said first and second faces are spaced apart by at least four side faces of said saw tooth, said side faces defining a cross-sectional area in a transverse plane disposed between said first and second faces.

4. The saw tooth as defined in claim 3, wherein said cross-sectional area is substantially bound by at least four equal length side edges.

5. The saw tooth as defined in claim 4, wherein four corner edges are disposed between each of said four equal length side edges, said corner edges corresponding to said cutting edges.

6. The saw tooth as defined in claim 3, wherein said four side faces include a first pair of said side faces which are parallel to each other and a second pair of said side faces which are parallel to each other.

7. The saw tooth as defined in claim 6, wherein said first pair and said second pair of side faces are parallel to each other.

8. The saw tooth as defined in claim 3, wherein said four side faces are each substantially parallel to the central tooth central axis extending between the first and second cutting faces.

9. The saw tooth as defined in claim 8, wherein said saw tooth is rotatable about said central tooth axis in increments such that a different one of said cutting edges is selectively locatable in an operable cutting position.

10. The saw tooth as defined in claim 8, wherein a central aperture extends through said saw tooth between said first and second faces, said central aperture having a longitudinal axis coaxial with said central axis of said saw tooth.

11. The saw tooth as defined in claim 1, wherein said saw tooth being symmetric about two perpendicular planes of symmetry intersecting along said central axis.

12. A cutting tooth for a rotary cutting machine, said cutting tooth comprising a body having two cutting faces disposed opposite each other and spaced apart by at least four side faces which are each parallel to an opposite one of said side faces, said side faces being parallel to a central axis extending between said two cutting faces, each said cutting faces comprising four cutting edges defined at the intersection between two adjacent side faces and each said respective cutting face, said cutting tooth being reversible by 180 degrees about a transverse reversing axis to dispose a selected one of said two cutting faces in an operable cutting position, the transverse reversing axis being substantially perpendicular to the central axis extending between said two cutting faces.

13. The cutting tooth as defined in claim 12, wherein one of said cutting edges is located at each of four corners of each of said cutting faces.

14. The cutting tooth as defined in claim 12, wherein said cutting tooth is rotatable in 90 degree increments about said central axis such that a different one of said four cutting edges is selectively locatable in an operable cutting position.

15. The cutting tooth as defined in claim 12, wherein said at least four side faces include at least a first pair and a second pair of side faces, each of said first and second pairs having two side faces opposite each other and equally spaced away from said central axis.

16. The cutting tooth as defined in claim 15, wherein said first pair of said side faces is inclined relative to a reference plane passing through said central axis, said reference plane being substantially perpendicular to said second pair of said side faces.

17. The cutting tooth as defined in claim 12, wherein said side faces define a cross-sectional area in a plane disposed transversely between said cutting faces.

18. The cutting tooth as defined in claim 17, wherein said transverse cross-sectional area is substantially bound by at least four side edges of equal length.

19. The cutting tooth as defined in claim 18, wherein four corner edges are disposed between each of said four side edges, said corner edges corresponding to said cutting edges.

20. The cutting tooth as defined in claim 12, wherein a central aperture extends therethrough between said two cutting faces, said central aperture having a longitudinal axis coaxial with said central axis of said cutting tooth.

21. The cutting tooth as defined in claim 20, said central aperture having thread therein for engagement with a threaded fastener.

22. The cutting tooth as defined in claim 12, wherein said cutting tooth is symmetric about two perpendicular planes of symmetry intersecting along said central axis.

23. A replaceable saw tooth comprising:

opposed front and rear faces, each of which at least partially defining at least two cutting edges;

a central aperture extending through the saw tooth between said front and rear faces, said central aperture defining a central axis therethrough, said central axis being perpendicular to a reference plane;

at least four side faces, each parallel to said central axis and extending between said front and rear faces, each of said side faces defining a face plane which is perpendicular to said reference plane, said side faces each having a perimeter thereabout defining a planar shape in said face plane, said planar shape being substantially similar for each of said side faces; and wherein the saw tooth is reversible by 180 degrees about a transverse reversing axis to dispose a selected one of said front and rear faces in an operable cutting position, the transverse reversing axis being substantially perpendicular to the central axis extending between said front and rear faces.

24. The replaceable saw tooth as defined in claim 23, wherein each of said front and rear faces at least partially defines more than two cutting edges.

25. The replaceable saw tooth as defined in claim 23, wherein an intermediate side face, extending between said front and rear faces, is disposed between each of said side faces.

26. The replaceable saw tooth as defined in claim 25, wherein said cutting edges are at least partially defined along a line of intersection between each of said intermediate side faces and said front and rear faces.

27. The replaceable saw tooth as defined in claim 23, wherein said side faces include a first pair of said side faces which are parallel to each other and a second pair of said side faces which are parallel to each other.

28. The replaceable saw tooth as defined in claim 27, wherein said first pair and said second pair of said side faces are parallel to each other.

29. The replaceable saw tooth as defined in claim 24, wherein four cutting edges are defined on each of said front and rear faces.

30. The replaceable saw tooth as defined in claim 29, wherein said four cutting edges are disposed at each of four corners of said front and rear faces.

31. The replaceable saw tooth as defined in claim 30, wherein said four cutting edges are equally spaced apart about a perimeter of said front and rear faces.

32. A replaceable saw tooth for a rotary cutting machine comprising:

a body having opposed front and back faces and opposed distal and proximal faces spacing apart opposed superior and inferior faces, said front and back faces being spaced apart by said distal and proximal faces and by said superior and inferior faces;

each said front and back faces comprising four projections projecting therefrom, one of each of said projections being located at the intersection of said distal and said inferior faces, said distal and said superior faces, said proximal and said inferior faces and said proximal and said superior faces, and each said projection comprising a base tapering to an upper edge, said upper edge comprising a cutting surface;

said tooth further comprising a front bore disposed in said front face and a back bore disposed in said back surface; and wherein the saw tooth is reversible by 180 degrees about a transverse reversing axis to dispose a selected one of said front and back faces in an operable cutting position, the transverse reversing axis being substantially perpendicular to a central axis extending between said front and back faces.

33. The replaceable saw tooth of claim 32 wherein said projections comprise a triangular base.

34. The replaceable saw tooth of claim 32 wherein each said projection comprises two upwardly converging lateral edges projecting from said base, wherein said base meets the base of an adjacent projection.

35. The replaceable saw tooth of claim 32 wherein at least one of said front and back faces is flat.

36. The replaceable saw tooth of claim 32 wherein at least one of said front and back faces is curved.

37. The replaceable saw tooth of claim 32 wherein said front bore connects to said back bore.

38. The replaceable saw of claim 32 wherein said distal and said proximal faces are of the same size.

39. The replaceable saw of claim 32 wherein said superior and said inferior faces are of the same size.

40. The replaceable saw of claim 32 wherein said distal and said proximal faces each meet said superior and said inferior faces at substantially right angles.

41. The replaceable saw of claim 32 wherein the plane of said distal and said proximal faces each meet the plane of said superior and of said inferior faces at substantially right angles.

42. The replaceable saw of claim 32 wherein said distal face meets said superior face at an angle of about 90 degrees minus theta, and wherein said distal face meets said inferior face at an angle of about 90 plus theta, wherein theta is selected from a range of about more than 0 and less than or equal to 5 degrees.

43. The replaceable saw of claim 32 wherein said distal face meets said superior face at an angle of about 90 degrees minus theta, and wherein said distal face meets said inferior face at an angle of about 90 plus theta, wherein theta is selected from a range of about more than 0 and less than or equal to 10 degrees.

44. The replaceable saw of claim 32 wherein said distal face meets said superior face at an angle of about 90 degrees minus theta, and wherein said distal face meets said inferior face at an angle of about 90 plus theta, wherein theta is selected from a range of about more than 0 and less than or equal to 25 degrees.

45. The replaceable saw of claim 32 wherein the intersection of said distal face with each of said superior and said inferior faces is chamfered, and wherein the intersection of said proximal face with each of said superior and said inferior faces is chamfered.

46. The replaceable saw of claim 45 wherein at least one of said chamfers is rounded.

47. A replaceable saw tooth comprising:

a body having opposed first and second faces being spaced apart by at least opposed third and fourth faces and opposed fifth and sixth faces;

each of said first and said second faces comprising a cavity, said cavity being defined by four lateral surfaces and a bottom surface;

each of said lateral surfaces being bound by downwardly diverging first and second lateral edges and by a bottom edge, said first lateral edge intersecting with the first lateral edge of an adjacent lateral surface and said second lateral edge intersecting with the second lateral edge of an adjacent lateral surface, said bottom surface comprising an orifice therethrough;

wherein said first lateral edge and said second lateral edge of each said lateral surface converge upwardly so as to form a cutting edge; and wherein the saw tooth is reversible by 180 degrees about a transverse reversing axis to dispose a selected one of said first and second faces in an operable cutting position, the transverse reversing axis being substantially perpendicular to a central axis extending between said first and second faces.

48. The replaceable saw tooth of claim 47 wherein said first lateral edges are substantially straight.

49. The replaceable saw tooth of claim 48 wherein said second lateral edges are substantially straight.

50. The replaceable saw tooth of claim 47 wherein said first lateral edges are curved.

51. The replaceable saw tooth of claim 48 wherein said second lateral edges are curved.

52. The replaceable saw tooth of claim 47 wherein said lateral surfaces are flat.

53. The replaceable saw tooth of claim 47 wherein said lateral surfaces are curved such that said four lateral surfaces create a substantially frustoconical form.

54. A replaceable saw tooth having:
opposed first and second surfaces spacing apart third and fourth surfaces, each said first, second, third and fourth surfaces spacing apart opposed front and back surfaces;

each said opposed first and second surfaces comprising opposed front and back edges disposed adjacent said respective front and back surfaces, each said front and back edges comprising a recessed portion having an opening adjacent said respective front and back surfaces;

each said opposed third and fourth surfaces comprising opposed front and back edges disposed adjacent said respective front and back surfaces, each said front and back edges comprising a recessed portion having an opening adjacent said respective front and back surfaces; and said front and back surfaces being recessed towards each other, each said front and back surface comprising a bore therethrough, a central axis extending between the front and back surfaces concentrically within said bores; and wherein the saw tooth is reversible by 180 degrees about a transverse reversing axis to dispose a selected one of said front and back faces in an operable cutting position, the transverse reversing axis being substantially perpendicular to the central axis extending between said front and back faces.

* * * * *